United States Patent
Awano et al.

(10) Patent No.: US 11,316,147 B2
(45) Date of Patent: Apr. 26, 2022

(54) NEGATIVE ELECTRODE ACTIVE MATERIAL, MIXED NEGATIVE ELECTRODE ACTIVE MATERIAL, NEGATIVE ELECTRODE FOR NONAQUEOUS ELECTROLYTE SECONDARY BATTERY, LITHIUM ION SECONDARY BATTERY, AND METHOD FOR PRODUCING NEGATIVE ELECTRODE ACTIVE MATERIAL

(71) Applicant: SHIN-ETSU CHEMICAL CO., LTD., Tokyo (JP)

(72) Inventors: Hidekazu Awano, Takasaki (JP); Takumi Matsuno, Annaka (JP); Hiromichi Kamo, Takasaki (JP); Takakazu Hirose, Annaka (JP); Masahiro Furuya, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 834 days.

(21) Appl. No.: 16/074,286

(22) PCT Filed: Jan. 27, 2017

(86) PCT No.: PCT/JP2017/002851
§ 371 (c)(1),
(2) Date: Jul. 31, 2018

(87) PCT Pub. No.: WO2017/141661
PCT Pub. Date: Aug. 24, 2017

(65) Prior Publication Data
US 2021/0193990 A1    Jun. 24, 2021

(30) Foreign Application Priority Data

Feb. 15, 2016 (JP) .............................. JP2016-026356

(51) Int. Cl.
*H01M 4/36* (2006.01)
*C01B 33/32* (2006.01)
(Continued)

(52) U.S. Cl.
CPC ........... *H01M 4/364* (2013.01); *C01B 33/325* (2013.01); *H01M 4/366* (2013.01); *H01M 4/48* (2013.01);
(Continued)

(58) Field of Classification Search
CPC ........ H01M 4/364; H01M 4/366; H01M 4/48; H01M 4/5825; H01M 4/587
See application file for complete search history.

(56) References Cited

U.S. PATENT DOCUMENTS 5,395,711 A    3/1995  Tahara et al.
5,656,391 A    8/1997  Hambitzer et al.
(Continued)

FOREIGN PATENT DOCUMENTS

CN    102263242 A    11/2011
CN    103229337 A    7/2013
(Continued)

OTHER PUBLICATIONS

Machine translation of JP 2014-532267 (no date).*
(Continued)

*Primary Examiner* — Amanda C. Walke
(74) *Attorney, Agent, or Firm* — Oliff PLC

(57) ABSTRACT

A negative electrode active material includes: particles of negative electrode active material, the particles of negative electrode active material contain particles of silicon compound containing a silicon compound ($SiO_x$: $0.5 \leq x \leq 1.6$); the particles of silicon compound contain at least one kind or more of $Li_2SiO_3$ and $Li_4SiO_4$; the particles of negative electrode active material contain $Li_2CO_3$ and LiOH on a
(Continued)

surface thereof; and a content of the $Li_2CO_3$ is 0.01% by mass or more and 5.00% by mass or less relative to a mass of the particles of negative electrode active material and a content of the LiOH is 0.01% by mass or more and 5.00% by mass or less relative to the mass of the particles of negative electrode active material. Thus a negative electrode active material is capable of improving initial charge/discharge characteristics and the cycle characteristics when used as a negative electrode active material of the secondary battery.

12 Claims, 3 Drawing Sheets

(51) Int. Cl.
*H01M 4/48* (2010.01)
*H01M 4/58* (2010.01)
*H01M 4/587* (2010.01)
*H01M 10/0525* (2010.01)
*H01M 4/02* (2006.01)

(52) U.S. Cl.
CPC ......... *H01M 4/587* (2013.01); *H01M 4/5825* (2013.01); *H01M 10/0525* (2013.01); *C01P 2002/60* (2013.01); *C01P 2002/72* (2013.01); *C01P 2002/86* (2013.01); *C01P 2004/61* (2013.01); *C01P 2004/80* (2013.01); *C01P 2006/40* (2013.01); *H01M 2004/027* (2013.01)

(56) References Cited

U.S. PATENT DOCUMENTS

| | | | |
|---|---|---|---|
| 6,193,946 | B1 | 2/2001 | Kawano et al. |
| 7,459,236 | B2 | 12/2008 | Konishiike et al. |
| 8,377,592 | B2 | 2/2013 | Jeong et al. |
| 10,256,459 | B1* | 4/2019 | Zhamu ................ H01M 4/0461 |
| 10,673,063 | B2* | 6/2020 | Zhamu .................. C01G 19/00 |
| 2006/0099507 | A1 | 5/2006 | Kogetsu et al. |
| 2008/0176137 | A1 | 7/2008 | Endo et al. |
| 2009/0202911 | A1 | 8/2009 | Fukuoka et al. |
| 2011/0287317 | A1 | 11/2011 | Nakanishi |
| 2014/0170485 | A1* | 6/2014 | Lee ......................... C22C 29/12 |
| | | | 429/211 |
| 2015/0221950 | A1 | 8/2015 | Minami et al. |
| 2015/0287989 | A1 | 10/2015 | Hirose et al. |
| 2016/0111711 | A1 | 4/2016 | Yoshikawa et al. |
| 2016/0233484 | A1 | 8/2016 | Hirose et al. |
| 2016/0351947 | A1 | 12/2016 | Kamo et al. |

FOREIGN PATENT DOCUMENTS

| | | | |
|---|---|---|---|
| CN | 103891014 | A | 6/2014 |
| CN | 104603993 | A | 5/2015 |
| CN | 104979524 | A | 10/2015 |
| CN | 107293701 | A * | 10/2017 |
| EP | 0 929 111 | A1 | 7/1999 |
| EP | 2 772 969 | A1 | 9/2014 |
| JP | 2997741 | B2 | 1/2000 |
| JP | 2001-185127 | A | 7/2001 |
| JP | 2002-042806 | A | 2/2002 |
| JP | 2006-114454 | A | 4/2006 |
| JP | 2006-164954 | A | 6/2006 |
| JP | 2007-059213 | A | 3/2007 |
| JP | 2007-234255 | A | 9/2007 |
| JP | 2008-177346 | A | 7/2008 |
| JP | 2008-251369 | A | 10/2008 |
| JP | 2008-282819 | A | 11/2008 |
| JP | 2009-070825 | A | 4/2009 |
| JP | 2009-205950 | A | 9/2009 |
| JP | 2009-212074 | A | 9/2009 |
| JP | 2014-532267 | A | 12/2014 |
| JP | 2015-002036 | A | 1/2015 |
| JP | 2015-149224 | A | 8/2015 |
| JP | 2015-153520 | A | 8/2015 |
| JP | 2015-198038 | A | 11/2015 |
| WO | 2014/049992 | A1 | 4/2014 |
| WO | 2015/025443 | A1 | 2/2015 |
| WO | 2015/118846 | A1 | 8/2015 |

OTHER PUBLICATIONS

Machine translation of JP 2015-149224(no date).*
Machine translation of CN-107293701-A(no date).*
May 15, 2020 Taiwanese Office Action issued in Taiwanese patent application No. 106104015.
Apr. 8, 2020 Search Report issued in Taiwanese Patent Application No. 106104015.
May 29, 2019 Extended European Search Report issued in European Patent Application No. 17752924.5.
Apr. 7, 2020 Office Action issued in Japanese Patent Application No. 2016-026356.
Mar. 24, 2021 Office Action issued in Chinese Patent Application No. 201780011304.X.
Aug. 21, 2018 International Preliminary Report on Patentability issued in International Patent Application No. PCT/JP2017/002851.
Sep. 2, 2020 Office Action issued in Chinese Patent Application No. 201780011304.X.
Sep. 29, 2020 Office Action is issued in Taiwanese Patent Application No. 106104015.
Feb. 5, 2019 Office Action issued in Japanese Patent Application No. 2016-26356.
May 9, 2017 International Search Report issued in Japanese Patent Application No. PCT/JP2017/002851.
Feb. 14, 2022 Office Action issued in European Patent Application No. 17752924.5.

* cited by examiner

[FIG. 1]
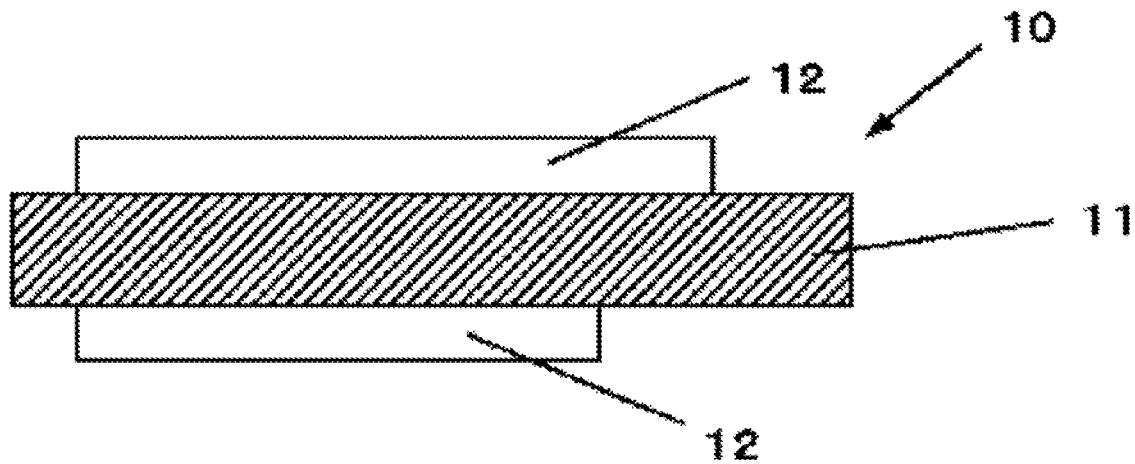
[FIG. 2]
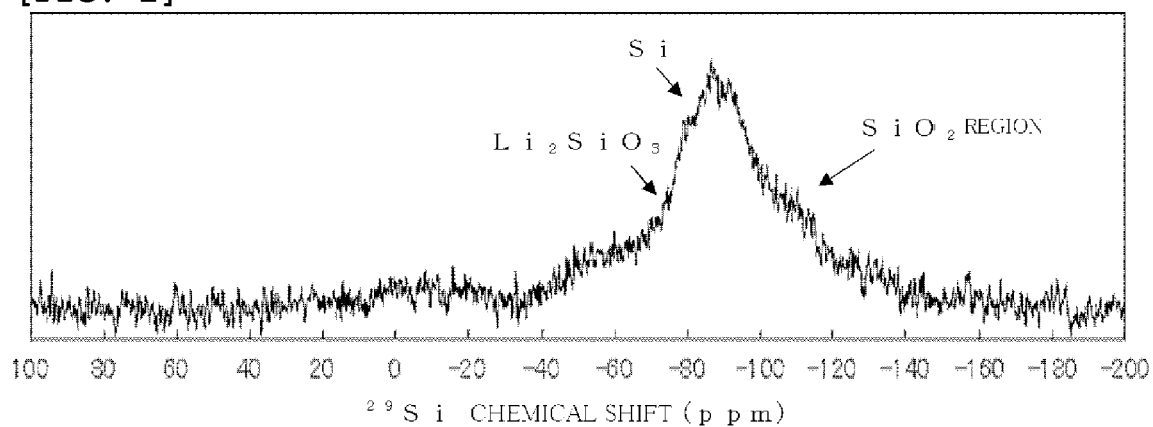
[FIG. 3]
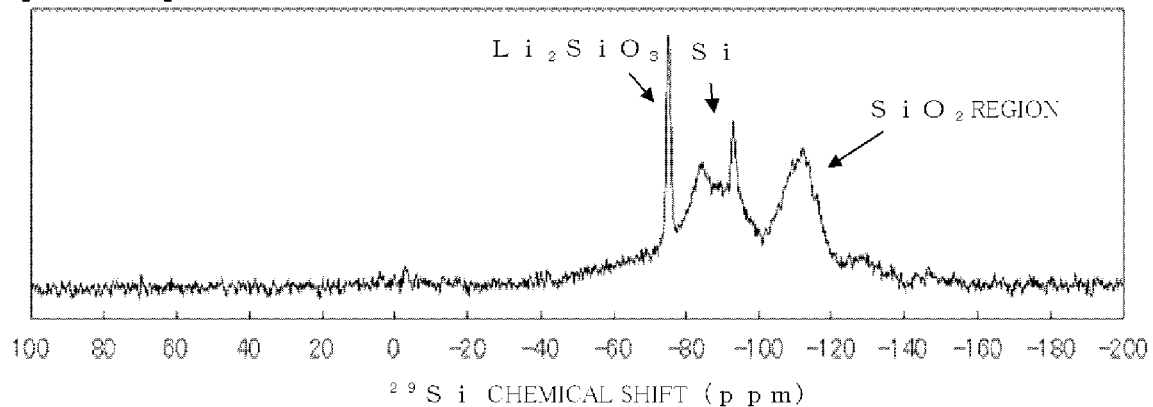

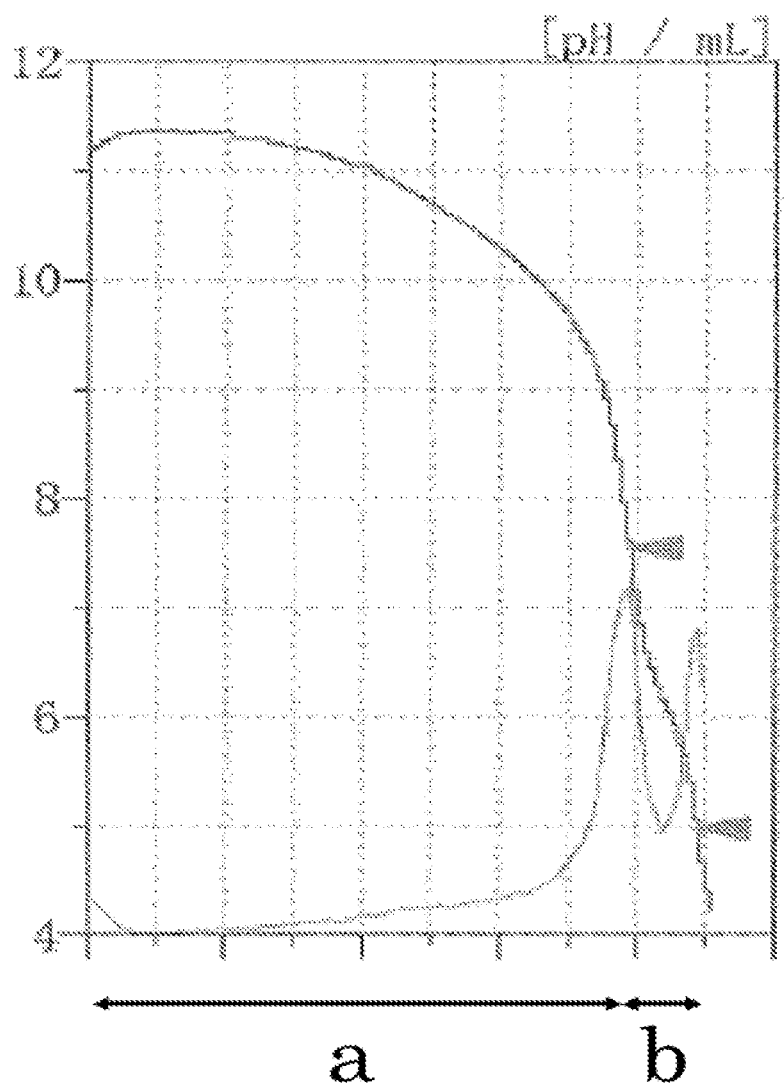
[FIG. 4]

[FIG. 5]
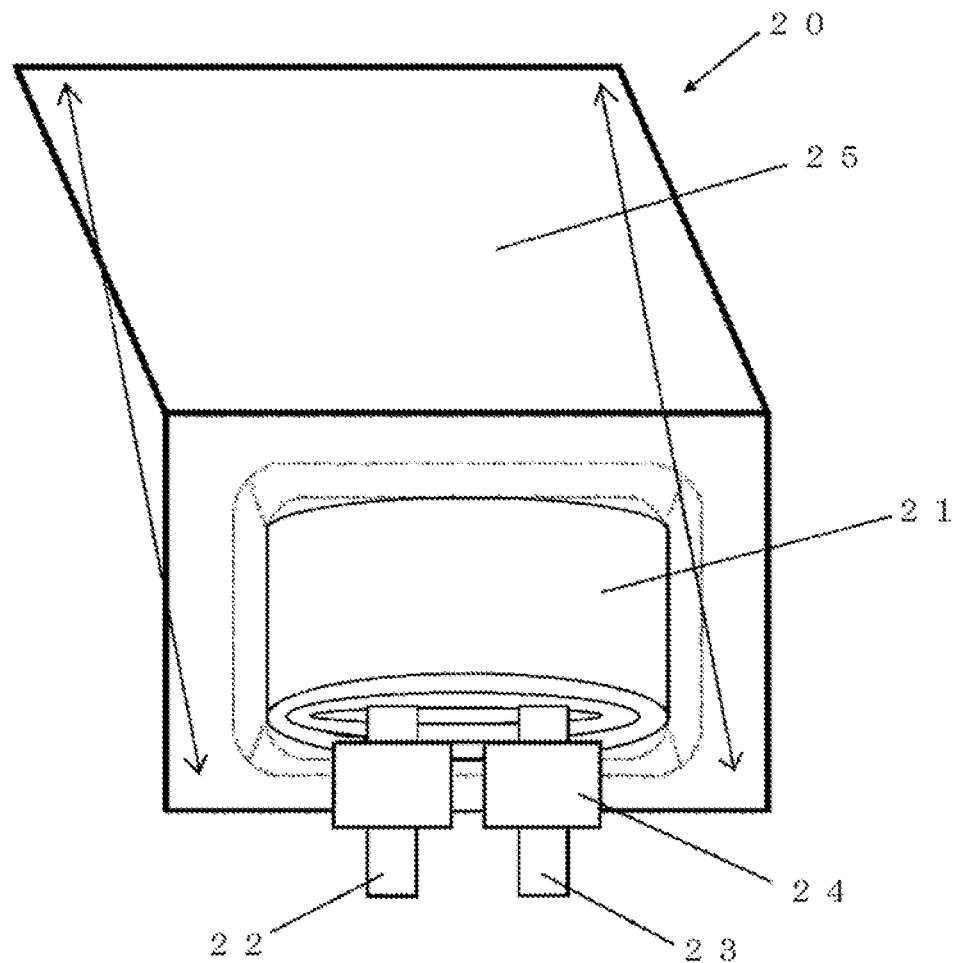
[FIG. 6]
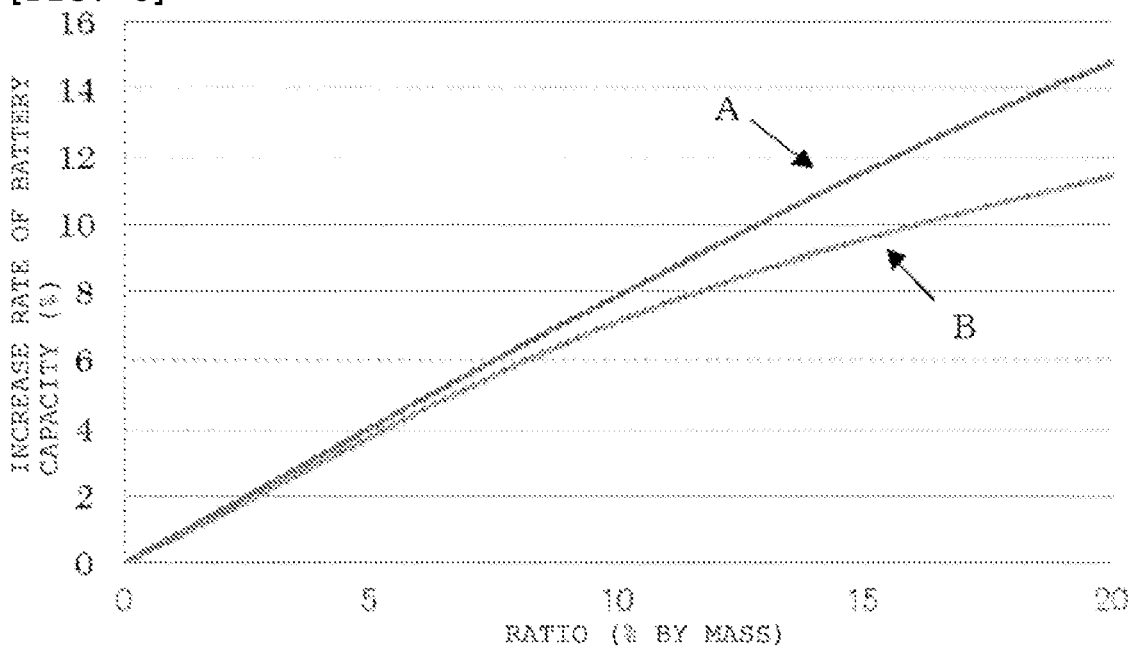

NEGATIVE ELECTRODE ACTIVE MATERIAL, MIXED NEGATIVE ELECTRODE ACTIVE MATERIAL, NEGATIVE ELECTRODE FOR NONAQUEOUS ELECTROLYTE SECONDARY BATTERY, LITHIUM ION SECONDARY BATTERY, AND METHOD FOR PRODUCING NEGATIVE ELECTRODE ACTIVE MATERIAL

TECHNICAL FIELD

The present invention relates to a negative electrode active material, a mixed negative electrode active material, a negative electrode for nonaqueous electrolyte secondary battery, a lithium ion secondary battery, and a method for producing a negative electrode active material.

BACKGROUND ART

In recent years, small-sized electronic devices represented by mobile terminals and the like have been widely spread and further down-sizing, lighter weight and longer life are strongly demanded. To a market demand like this, developments of secondary batteries capable of obtaining, in particular, a smaller size, a lighter weight and a higher energy density have been forwarded. The secondary batteries have been studied to apply also to large-sized electronic devices represented by automobiles and power-storage systems represented by houses or the like without limiting to small-sized electronic devices.

Among these, a lithium ion secondary battery is highly expected because smaller size and higher capacity are easy to obtain and the energy density higher than that of a lead battery or a nickel-cadmium battery may be obtained.

The lithium ion secondary battery includes a positive electrode and a negative electrode, and an electrolytic solution together with a separator. The negative electrode includes a negative electrode active material related to a charge/discharge reaction.

As the negative electrode active material, while a carbon-based active material is widely used, a further improvement in a battery capacity is demanded from recent market demand. In order to improve the battery capacity, it has been studied to use silicon as the negative electrode active material. This is because the silicon has a theoretical capacity (4199 mAh/g) of 10 times or more a theoretical capacity of graphite (372 mAh/g), and a great improvement in the battery capacity is expected. A development of a silicon material as the negative electrode active material includes studies on not only a silicon simple substance but also on compounds represented by alloys, oxides or the like. Furthermore, shapes of the active material have been studied, regarding the carbon-based active material, from a standard coating type to an integrated type directly deposited on a current collector.

However, when the silicon is used as a main raw material as the negative electrode active material, since the negative electrode active material expands and contracts during charge/discharge, mainly the neighborhood of a superficial layer of the negative electrode active material becomes easily broken. Furthermore, an ionic substance is generated inside the active material, and the negative electrode active material becomes easily broken. When the superficial layer of the negative electrode active material is broken, a new surface is generated thereby, and a reaction area of the active material increases. At this time, the electrolytic solution is consumed since a decomposition reaction of an electrolytic solution occurs on the new surface and a film that is a decomposition product of the electrolytic solution is formed on the new surface. Therefore, the cycle characteristics become easily degraded.

Until now, in order to improve an initial efficiency and cycle characteristics of a battery, negative electrode materials for lithium ion secondary batteries having the silicon material as a main material and electrode configurations have been variously studied.

Specifically, in order to obtain excellent cycle characteristics and high safety, silicon and amorphous silicon dioxide are simultaneously deposited by using a gas phase method (see, for example, Patent Literature 1 below). Furthermore, in order to obtain high battery capacity and safety, a carbon material (an electronically conductive material) is provided on a superficial layer of particles of silicon oxide (see, for example, Patent Literature 2 below). Furthermore, in order to improve the cycle characteristics and to obtain high input/output characteristics, an active material containing silicon and oxygen is prepared and an active material layer having a high oxygen ratio in the neighborhood of a current collector is formed (see, for example, Patent Literature 3 below). Still furthermore, in order to improve the cycle characteristics, oxygen is contained in a silicon active material such that an average oxygen content is 40 atomic percent or less, and an oxygen content is high in a place close to a current collector (see, for example, Patent Literature 4 below).

Furthermore, in order to improve a first time charge/discharge efficiency, a nano composite containing a Si phase, $SiO_2$ and $M_yO$ metal oxide is used (see, for example, Patent Literature 5, below). Still furthermore, in order to improve the cycle characteristics, $SiO_x$ ($0.8 \leq x \leq 1.5$, a particle size range=1 μm to 50 μm) and a carbon material are mixed and sintered at a high temperature (see, for example, Patent Literature 6, below). Furthermore, in order to improve the cycle characteristics, an active material is controlled in the range such that a molar ratio of oxygen to silicon in a negative electrode active material is from 0.1 to 1.2, and, a difference of the maximum value and the minimum value of the molar ratio in the neighborhood of an interface of the active material and a current collector is 0.4 or less (see, for example, Patent Literature 7, below). Still furthermore, in order to improve battery load characteristics, a metal oxide containing lithium is used (see, for example, Patent Literature 8, below). Furthermore, in order to improve the cycle characteristics, a hydrophobic layer such as a silane compound is formed on a superficial layer of a silicon material (see, for example, Patent Literature 9, below). Still furthermore, in order to improve the cycle characteristics, silicon oxide is used, and a graphite film is formed on a superficial layer thereof to impart electric conductivity (see, for example, Patent Literature 10, below). In the Patent Literature 10, regarding a shift value obtained from a Raman spectrum of the graphite film, broad peaks appear at 1330 $cm^{-1}$ and 1580 $cm^{-1}$, and an intensity ratio thereof $I_{1330}/I_{1580}$ is $1.5 < I_{1330}/I_{1580} < 3$. Furthermore, in order to obtain high battery capacity and to improve cycle characteristics, particles having a silicon crystallite phase dispersed in silicon dioxide are used (see, for example, Patent Literature 11, below). Still furthermore, in order to improve overcharge and overdischarge characteristics, silicon oxide in which an atomic ratio of silicon and oxygen is controlled to 1: y ($0<y<2$) is used (see, for example, Patent Literature 12, below).

CITATION LIST

Patent Literature

Patent Literature 1: JP 2001-185127 A
Patent Literature 2: JP 2002-042806 A
Patent Literature 3: JP 2006-164954 A
Patent Literature 4: JP 2006-114454 A
Patent Literature 5: JP 2009-070825 A
Patent Literature 6: JP 2008-282819 A
Patent Literature 7: JP 2008-251369 A
Patent Literature 8: JP 2008-177346 A
Patent Literature 9: JP 2007-234255 A
Patent Literature 10: JP 2009-212074 A
Patent Literature 11: JP 2009-205950 A
Patent Literature 12: JP 2997741 B1

SUMMARY OF INVENTION

Technical Problem

As was described above, in recent years, higher performance and multi-functionalization of small-sized mobile devices typical in the electronic devices have been forwarded, and a lithium ion secondary battery that is a main power source thereof is required to have an increased battery capacity. As one measure to solve the problem, it is desired to develop a lithium ion secondary battery formed of a negative electrode that uses a silicon material as a main material. Furthermore, the lithium ion secondary battery that uses the silicon material is desired to have the first time efficiency and cycle characteristics close to equivalent with those of a lithium ion secondary battery that uses a carbon-based active material. However, a negative electrode active material that shows the same first time efficiency and cycle stability as those in the lithium ion secondary battery that uses a carbon-based active material has not been proposed.

The present invention was performed in view of the above problems, and it is intended to provide a negative electrode active material which is capable of improving initial charge/discharge characteristics and cycle characteristics when used as the negative electrode active material of a secondary battery, a mixed negative electrode active material containing the negative electrode active material, a negative electrode having a negative electrode active material layer formed with the negative electrode active material, and a lithium ion secondary battery that uses the negative electrode active material of the present invention. Furthermore, it is also intended to provide a method of producing a negative electrode active material of the present invention capable of improving the initial charge/discharge characteristics and cycle characteristics.

Solution to Problem

In order to achieve the above object, the present invention provides a negative electrode active material including: particles of negative electrode active material, wherein the particles of negative electrode active material contain particles of silicon compound containing a silicon compound ($SiO_x : 0.5 \leq x \leq 1.6$); the particles of silicon compound contain at least one kind or more of $Li_2SiO_3$ and $Li_4SiO_4$; the particles of negative electrode active material contain $Li_2CO_3$ and LiOH on a surface thereof; and a content of the $Li_2CO_3$ is 0.01% by mass or more and 5.00% by mass or less relative to a mass of the particles of negative electrode active material and a content of the LiOH is 0.01% by mass or more and 5.00% by mass or less relative to the mass of the particles of negative electrode active material.

The negative electrode active material of the present invention may improve the battery capacity because the negative electrode active material contains particles of negative electrode active material (also called as particles of silicon-based active material) containing particles of silicon compound. Furthermore, irreversible capacity generated during the charge may be reduced because a $SiO_2$ component part that is destabilized during insertion, desorption of lithium during charge/discharge of a battery in the silicon compound is modified to lithium silicate in advance. Furthermore, the electronic conductivity is improved because Li is easy to diffuse due to presence of $Li_2CO_3$ and LiOH on a surface of the negative electrode active material. Here, when a content of each of $Li_2CO_3$ and LiOH is less than 0.01% by mass, the electronic conductivity is degraded because an amount of Li that is a medium when Li diffuses is excessively small. Furthermore, when a content of each of $Li_2CO_3$ and LiOH is more than 5.00% by mass, the electronic conductivity is degraded because amounts of these Li compounds are excessive. That is, when the content of each of $Li_2CO_3$ and LiOH is 0.01% by mass or more and 5.00% by mass or less, excellent electronic conductivity may be obtained. Accordingly, a surface state optimum for charge/discharge is obtained. As a result thereof, the initial efficiency and cycle characteristics of a battery are improved.

At this time, it is preferable that the particles of negative electrode active material have the pH of 10 to 13 of a filtrate obtained by dispersing the particles of negative electrode active material in pure water such that a mass ratio of the particles of negative electrode active material and the pure water is 1:20 and by filtering.

The negative electrode active material like this may improve the initial efficiency and cycle characteristics of the secondary battery because the stability in a slurry used during preparation of the negative electrode becomes high.

Furthermore, at this time, it is preferable that the particles of negative electrode active material have a molar ratio $M_{Li}/M_{Si}$ of Li and Si contained in the filtrate obtained by dispersing the particles of negative electrode active material in pure water and filtering that satisfies a relationship of $10 \geq M_{Li}/M_{Si} \geq 0.5$.

When the $M_{Li}/M_{Si} \geq 0.5$ is satisfied, the electronic conductivity is more improved because it may be said that the Li that becomes a medium for dispersing the Li is present in a sufficient amount. Furthermore, when the $10 \geq M_{Li}/M_{Si}$ is satisfied, the electronic conductivity is more improved, because it may be said that an amount of a Li compound is appropriate. Accordingly, when the $10 \geq M_{Li}/M_{Si} \geq 0.5$ is satisfied, the negative electrode active material that may further improve the initial efficiency and cycle characteristics of the secondary battery is obtained.

Furthermore, it is preferable that the particles of silicon compound have a half value width (2θ) of a diffraction peak derived from a Si(111) crystal plane obtained by X-ray diffractometry of 1.2° or more and a crystallite size corresponding to the crystal plane of 7.5 nm or less.

When the negative electrode active material in which the particles of silicon compound have the silicon crystallinity is used as the negative electrode active material of a lithium ion secondary battery, more excellent cycle characteristics and initial charge/discharge characteristics may be obtained.

Furthermore, it is preferable that the negative electrode active material of the present invention satisfies a relationship of A>B between a maximum peak intensity value A in a Si and Li silicate region provided by −60 to −95 ppm as a chemical shift value and a peak intensity value B of a $SiO_2$ region provided by −96 to −150 ppm as the chemical shift value, which are obtained from $^{29}$Si-MAS-NMR spectrum in the particles of silicon compound.

When an amount of Si and $Li_2SiO_3$ is more abundant relative to the $SiO_2$ component in the particles of silicon compound, a negative electrode active material that may sufficiently obtain an improvement effect of the battery characteristics due to the insertion of Li is obtained.

Furthermore, when a test cell formed of a negative electrode containing a mixture of the negative electrode active material and a carbon-based active material and a counter electrode lithium is prepared, in the test cell, charge/discharge including charge during which a current is flowed so as to insert lithium into the negative electrode active material and discharge during which the current is flowed so as to desorb the lithium from the negative electrode active material is carried out 30 times, and a graph showing a relationship between a differential value dQ/dV obtained by differentiating a discharge capacity Q in each charge/discharge by a potential V of the negative electrode based on the counter electrode lithium and the potential V is depicted, the potential V of the negative electrode during discharges on or after X times ($1 \leq X \leq 30$) preferably has a peak in the range of from 0.40 V to 0.55 V.

Since the above peak in the V-dQ/dV curve is similar to the peak of the silicon material and has a sharp rise of a discharge curve on a higher potential side, when a battery is designed, a capacity is easily developed. Furthermore, the negative electrode substance in which a stable bulk is formed is obtained when the peak is developed during the charge/discharge within 30 times.

Furthermore, a median diameter of the particles of negative electrode active material is preferably 1.0 µm or more and 15 µm or less.

When the median diameter is 1.0 µm or more, an increase of the battery irreversible capacity may be suppressed from increasing due to an increase in a surface area a mass. On the other hand, by setting the median diameter to 15 µm or less, the particles become difficult to be cracked and a new surface is difficult to be developed.

Furthermore, it is preferable that the particles of negative electrode active material contain a carbon material on a superficial part.

Thus, the electric conductivity may be improved when the particles of negative electrode active material contain the carbon material on the superficial part thereof.

Furthermore, it is preferable that an average thickness of the carbon material is 10 nm or more and 5000 nm or less.

The electric conductivity may be improved when the average thickness of the carbon material is 10 nm or more. Furthermore, when an average thickness of the carbon material to be coated is 5000 nm or less, by using the negative electrode active material containing the particles of negative electrode active material like this in a lithium ion secondary battery, the battery capacity may be suppressed from degrading because the particles of silicon compound may be sufficiently secured.

A mixed negative electrode active material characterized by containing the negative electrode active material and the carbon-based active material is provided.

Thus, the electric conductivity of the negative electrode active material layer may be improved and an expansion stress accompanying the charge may be alleviated when the carbon-based active material is contained together with the negative electrode active material (silicon-based negative electrode active material) of the present invention as a material forming a negative electrode active material layer. Furthermore, by mixing the silicon-based negative electrode active material with the carbon-based active material, the battery capacity may be improved.

Furthermore, in order to achieve the object, the present invention provides a negative electrode for nonaqueous electrolyte secondary battery, characterized by containing the mixed negative electrode active material and by having a ratio of a mass of the negative electrode active material relative to a sum total of masses of the negative electrode active material and the carbon-based active material of 6% by mass or more.

The battery capacity may be further improved, when the rate of the mass of the negative electrode active material (silicon-based negative electrode active material) relative to a sum total of masses of the negative electrode active material (silicon-based negative electrode active material) and the carbon-based active material is 6% by mass or more.

Furthermore, in order to achieve the object, the present invention provides a negative electrode for nonaqueous electrolyte secondary battery, including: a negative electrode active material layer formed with the mixed negative electrode active material according to claim 10; and a negative electrode current collector, wherein the negative electrode active material layer is formed on the negative electrode current collector; and the negative electrode current collector contains carbon and sulfur, and a content of each thereof is 100 mass ppm or less.

Thus, the negative electrode may be suppressed from being deformed during the charge when the negative electrode current collector constituting the negative electrode contains the carbon and sulfur in the amount described above.

Furthermore, in order to achieve the object, the present invention provides a lithium ion secondary battery characterized by using the negative electrode containing the negative electrode active material.

High capacity, excellent cycle characteristics and initial charge/discharge characteristics are obtained when the lithium ion secondary battery uses the negative electrode containing the negative electrode active material like this.

Furthermore, in order to achieve the object, the present invention provides a method for producing a negative electrode active material containing particles of negative electrode active material containing particles of silicon compound including: preparing particles of negative electrode active material by preparing particles of silicon compound containing a silicon compound (SiOx: $0.5 \leq x \leq 1.6$); and by inserting lithium into the particles of silicon compound; and preparing the particles of negative electrode active material in which a content of the $Li_2CO_3$ is 0.01% by mass or more and 5.00% by mass or less relative to a mass of the particles of negative electrode active material and a content of LiOH is 0.01% by mass or more and 5.00% by mass or less relative to the mass of the particles of negative electrode active material by generating lithium nitride on a surface of the particles of negative electrode active material; and by generating $Li_2CO_3$ and LiOH on a surface of the particles of negative electrode active material by washing the particles of negative electrode active material on the surface of which lithium nitride is generated with a solution containing water; and producing the negative electrode active material with the prepared particles of negative electrode active material.

When the negative electrode active material is produced like this, a negative electrode active material having high capacity and excellent cycle characteristics and initial charge/discharge characteristics when used as the negative electrode active material of a lithium ion secondary battery may be produced.

At this time, it is preferable to perform the generating lithium nitride on a surface of the particles of negative electrode active material by making the particles of negative electrode active material and a lithium compound and nitrogen contact in a dispersion liquid or by performing by mixing the particles of negative electrode active material and LiH and heating.

In the present invention, thus, the particles of negative electrode active material containing $Li_2CO_3$ and LiOH in the above contents may be surely prepared.

Furthermore, in order to achieve the object, the present invention provides a method for producing a lithium ion secondary battery including: preparing a negative electrode using the negative electrode active material produced according to the method for producing the negative electrode active material; and producing a lithium ion secondary battery with the prepared negative electrode.

A lithium ion secondary battery having high capacity and excellent cycle characteristics and initial charge/discharge characteristics may be produced by using the negative electrode active material produced as described above.

Advantageous Effects of Invention

The negative electrode active material of the present invention may obtain high capacity and excellent cycle characteristics and initial charge/discharge characteristics when used as the negative electrode active material of secondary batteries. Furthermore, similar effect may be obtained also in the mixed negative electrode active material, the negative electrode, and the lithium ion secondary battery, which contain the negative electrode active material. Furthermore, according to the method for producing negative electrode active material of the present invention, a negative electrode active material having excellent cycle characteristics and initial charge/discharge characteristics may be produced when used as the negative electrode active material of the secondary battery.

BRIEF DESCRIPTION OF DRAWINGS

FIG. 1 is a cross-sectional diagram showing a configuration of a negative electrode for nonaqueous electrolyte secondary battery of the present invention;

FIG. 2 is one example of a $^{29}$Si-MAS-NMR spectrum measured from particles of silicon compound when modified by a redox method;

FIG. 3 is one example of the $^{29}$Si-MAS-NMR spectrum measured from the particles of silicon compound when modified by a thermal doping method;

FIG. 4 is a diagram that shows one example of a titration curve in a neutralization titration of a filtrate;

FIG. 5 is a diagram expressing a configuration example (laminate film type) of a lithium secondary battery of the present invention; and FIG. 6 is a graph expressing a relationship between a ratio of the particles of silicon-based active material relative to a total amount of the negative electrode active material and an increase rate of battery capacity of the secondary battery.

DESCRIPTION OF EMBODIMENTS

In what follows, an embodiment of the present invention will be described. However, the present invention is not limited thereto.

As was described above, as one of methods for increasing the battery capacity of the lithium ion secondary battery, it has been studied to use a negative electrode that uses a silicon material as a main material as a negative electrode of a lithium ion secondary battery. The lithium ion secondary battery that uses the silicon material is desired to have the initial charge/discharge characteristics and cycle characteristics close to the same as the lithium ion secondary battery that uses the carbon-based active material. However, a negative electrode active material that shows the initial charge/discharge characteristics and cycle characteristics equivalent with the lithium ion secondary battery that uses the carbon-based active material has not been proposed.

There, the present inventors have conducted intensive studies to obtain a negative electrode active material that has high battery capacity, and excellent cycle characteristics and first time efficiency when used in a secondary battery, and came to the present invention.

The negative electrode active material of the present invention contains particles of negative electrode active material. And the particles of negative electrode active material contain the particles of silicon compound containing a silicon compound (SiOx: $0.5 \leq x \leq 1.6$). The particles of silicon compound contain at least one kind or more of lithium silicates of $Li_2SiO_3$ and $Li_4SiO_4$. The particles of negative electrode active material contain $Li_2CO_3$ and LiOH on a surface thereof, and a content of $Li_2CO_3$ is 0.01% by mass or more and 5.00% by mass or less relative to a mass of the particles of negative electrode active material, and a content of LiOH is 0.01% by mass or more and 5.00% by mass or less relative to the mass of the particles of negative electrode active material.

The negative electrode active material like this may improve the battery capacity because the particles of negative electrode active material (also called as particles of silicon-based active material) containing the particles of silicon compound are contained. Furthermore, the irreversible capacity generated during charge may be reduced because a $SiO_2$ component part that is destabilized during insertion/desorption of lithium during charge/discharge of the battery is modified to lithium silicates in advance. Furthermore, the electronic conductivity may be improved because due to presence of $Li_2CO_3$ and LiOH on a surface of the negative electrode active material, the Li is easily diffused. Here, when a content of each of $Li_2CO_3$ and LiOH is less than 0.01% by mass, the electronic conductivity is degraded because an amount of Li that is a medium when the Li diffuses is too small. Furthermore, when a content of each of $Li_2CO_3$ and LiOH is more than 5.00% by mass, the electronic conductivity is degraded because an amount of Li is excessive. These lithium compounds may be a film on a surface of the particles of negative electrode active material. However, in this case, a film thickness becomes too thick when a content of each of $Li_2CO_3$ and LiOH is more than 5.00% by mass. That is, when a content of each of $Li_2CO_3$ and LiOH is 0.01% by mass or more and 5.00% by mass or less, a surface state optimum for charge/discharge is obtained because excellent electronic conductivity is obtained. As a result thereof, initial efficiency and cycle characteristics of the secondary battery are improved.

<Negative Electrode for Nonaqueous Electrolyte Secondary Battery>

First, a negative electrode for nonaqueous electrolyte secondary battery will be described. FIG. 1 shows a cross-sectional configuration of a negative electrode for nonaqueous electrolyte secondary battery (hereinafter, referred to also as "negative electrode") in one embodiment of the present invention.

[Configuration of Negative Electrode]

As shown in FIG. 1, a negative electrode 10 is configured to have a negative electrode active material layer 12 on a negative electrode current collector 11. The negative electrode active material layer 12 may be formed on both surfaces or only on one surface of the negative electrode current collector 11. Furthermore, when a negative electrode active material of the present invention is used, the negative electrode current collector 11 may not be used.

(Negative Electrode Current Collector)

The negative electrode current collector 11 is configured of a substance that is an excellent electrically conductive material and has excellent mechanical strength. As the electrically conductive materials that may be used for the negative electrode current collector 11, for example, copper (Cu) or nickel (Ni) may be used. It is preferable that the electrically conductive material does not form an intermetallic compound with lithium (Li).

It is preferable that the negative electrode current collector 11 contains carbon (C) or sulfur (S) other than a main element. This is because the physical strength of the negative electrode current collector may be improved. In particular, in the case where an active material layer that expands during charge is included, deformation of the electrode including the current collector may be suppressed when the current collector includes the elements. Although contents of the elements are not particularly limited, among these, each is preferably 100 mass ppm or less. This is because higher deformation suppression effect is obtained. Due to the deformation suppression effect like this, the cycle characteristics may be further improved.

Furthermore, a surface of the negative electrode current collector 11 may be roughened or may not be roughened. The roughened negative electrode current collector is a metal foil treated by, for example, an electrolytic treatment, an embossing treatment, or a chemical etching treatment. The negative electrode current collector that is not roughened is, for example, a rolled metal foil.

[Negative Electrode Active Material Layer]

The negative electrode active material layer 12 contains a negative electrode active material of the present invention capable of occluding and emitting lithium ions, and, from the viewpoint of battery design, may further contain other materials such as a negative electrode binder or a conductive assistant. The negative electrode active material contains particles of negative electrode active material, and the particles of negative electrode active material contain particles of silicon compound containing a silicon compound ($SiO_x$: $0.5 \leq x \leq 1.6$).

Furthermore, the negative electrode active material layer 12 may contain a mixed negative electrode active material that contains the negative electrode active material of the present invention and a carbon-based active material. Electric resistance of the negative electrode active material layer is lowered thereby, and the expansion stress accompanying the charge may be alleviated. Examples of the carbon-based active materials include pyrolytic carbons, cokes, glass-like carbon fibers, organic polymer compound sinters, carbon blacks and the like.

Furthermore, it is preferable that a ratio of a mass of the negative electrode active material (silicon-based negative electrode active material) relative to a sum total of masses of the negative electrode active material (silicon-based negative electrode active material) of the present invention and the carbon-based active material is 6% by mass or more. When the ratio of the mass of the negative electrode active material of the present invention relative to a sum total of masses of the negative electrode active material of the present invention and the carbon-based active material is 6% by mass or more, the battery capacity may be surely improved.

Furthermore, the negative electrode active material of the present invention such as described above contains particles of silicon compound, the particles of silicon compound are a silicon oxide material containing a silicon compound ($SiO_x$:$0.5 \leq x \leq 1.6$), and the composition thereof preferably has "x" closer to 1. This is because high cycle characteristics may be obtained. By the way, the composition of the silicon compound in the present invention does not necessarily mean a purity of 100%, but may contain a slight amount of impurities.

Furthermore, in the negative electrode active material of the present invention, the particles of silicon compound contains at least one kind or more of $Li_2SiO_3$ and $Li_4SiO_4$. Since these are obtained by modifying a $SiO_2$ component part that is destabilized during insertion/desorption of the lithium during charge/discharge of the battery to another silicate in advance, the irreversible capacity generated during charge may be reduced.

Furthermore, although the battery characteristics may be improved by the existence of at least one kind or more of $Li_4SiO_4$ and $Li_2SiO_3$ in the inside of a bulk of the particles of silicon compound, the battery characteristics are more improved when the above two kinds of Li compounds are present together. By the way, these lithium silicates may be quantified by NMR (Nuclear Magnetic Resonance) or XPS (X-ray photoelectron spectroscopy). Measurements of XPS and NMR are performed, for example, under the following conditions.

XPS
- Device: X-ray photoelectron spectrometer,
- X-ray source: monochromatic Al—K alpha line,
- X-ray spot diameter: 100 μm, and
- Ar ion gun sputtering condition: 0.5 kV/2 mm×2 mm. $^{29}$Si MAS NMR (magic angle rotation nuclear magnetic resonance)
- Device: 700 NMR Spectrometer produced by Bruker Inc.,
- Probe: 4 mm HR-MAS Rotor 50 μL,
- Sample revolving speed: 10 kHz, and
- Measurement environment temperature: 25°.

Furthermore, it is preferable that the particles of silicon compound have a half value width (2θ) of a diffraction peak derived from a Si(111) crystal plane obtained by X-ray diffractometry of 1.2° or more and a crystallite size corresponding to the crystal plane of 7.5 nm or less. The lower the silicon crystallinity of the silicon compound in the particles of silicon compound is, the better, in particular, the lower an abundance of Si crystals is, the more the battery characteristics is improved, furthermore, a stable Li compound may be generated.

Furthermore, it is preferable that the negative electrode active material of the present invention satisfies a relationship of A>B between a maximum peak intensity value A in a Si and Li silicate region provided by −60 to −95 ppm as a chemical shift value and a peak intensity value B in a $SiO_2$ region provided by −96 to −150 ppm as the chemical shift value, which are obtained from a $^{29}$Si-MAS-NMR spectrum in the particles of silicon compound. In the particles of silicon compound, when an amount of a silicon component or $Li_2SiO_3$ is relatively abundant relative to a $SiO_2$ component, an improvement effect of the battery characteristics due to the insertion of Li may be sufficiently obtained. By the way, measurement conditions of the $^{29}$Si-MAS-NMR spectrum may be the same as above.

Furthermore, in the negative electrode active material of the present invention, it is preferable that the particles of negative electrode active material contain a carbon material in a superficial layer part. When the particles of negative electrode active material contain the carbon material in the superficial part thereof, the electric conductivity may be improved. Therefore, when the negative electrode active material containing the particles of negative electrode active material like this is used as the negative electrode active material of the secondary battery, the battery characteristics may be improved.

Furthermore, it is preferable that an average thickness of the carbon material of the superficial layer part of the particles of negative electrode active material is 10 nm or more and 5000 nm or less. When the average thickness of the carbon material is 10 nm or more, the electric conductivity may be improved, and in the case where the average thickness of the carbon material to be coated is 5000 nm or less, the battery capacity may be suppressed from decreasing when the negative electrode active material containing the particles of negative electrode active material like this is used as the negative electrode active material of the lithium ion secondary battery.

The average thickness of the carbon material may be calculated according to, for example, the following procedure. First, the particles of negative electrode active material are observed at an arbitrary magnification by TEM (transmission type electron microscope). It is preferable that the magnification is a magnification that allows visual confirmation of a thickness of the carbon material such that the thickness may be measured. Subsequently, at optional 15 points, the thickness of the carbon material is measured. In this case, it is preferable to set measurement positions broadly and at random without concentrating on particular positions as much as possible. Last, an average value of the thicknesses of the carbon material at the 15 points is calculated.

Although a coverage of the carbon material is not particularly limited, the coverage is desirably high to a maximum extent. When the coverage is 30% or more, it is preferable because the electric conductivity is further improved. Although a covering method of the carbon material is not particularly limited, a sugar carbonization method and a pyrolysis method of hydrocarbon gas are preferred. This is because a coverage factor may be improved.

Furthermore, it is preferable that a median diameter ($D_{50}$: a particle size when a cumulative volume becomes 50%) of the particles of negative electrode active material is 1.0 μm or more and 15 μm or less. This is because when the median diameter is within the above range, lithium ions become easy to be occluded and emitted during charge/discharge and crack of the particles becomes difficult to occur. When the median diameter is 1.0 μm or more, a surface area a mass may be made smaller, and an increase in the battery irreversible capacity may be suppressed. On the other hand, when the median diameter is set to 15 μm or less, a new surface is difficult to appear because the particles become difficult to be cracked.

Furthermore, it is preferable that the particles of negative electrode active material have the pH of from 10 to 13 of a filtrate obtained by dispersing the particles of the negative electrode active material in pure water such that a mass ratio of the particles of negative electrode active material and the pure water is 1:20 and filtering. The negative electrode active material like this may more improve the initial efficiency and the cycle characteristics of the secondary battery because the slurry used during preparation of the negative electrode has high stability.

Furthermore, at this time, it is preferable that the particles of negative electrode active material have a molar ratio $M_{Li}/M_{Si}$ of Li and Si contained in a filtrate obtained by dispersing and filtering the particles of negative electrode active material that satisfies a relationship of $10 \geq M_{Li}/M_{Si} \geq 0.5$. When the $M_{Li}/M_{Si} \geq 0.5$ is satisfied, the electronic conductivity is more improved, because it may be said that there is a sufficient amount of Li that becomes a medium when the Li diffuses. Furthermore, when the $10 \geq M_{Li}/M_{Si}$ is satisfied, the electronic conductivity is more improved because an amount of the Li compound is more appropriate. Accordingly, when the $10 \geq M_{Li}/M_{Si} \geq 0.5$ is satisfied, a negative electrode active material that may improve the initial efficiency and cycle characteristics of the secondary battery is obtained.

Each substance amount of Li and Si in the filtrate may be measured by, for example, inductively coupled plasma optical emission spectroscopy (ICP-OES) or inductively coupled plasma mass spectrometer (ICP-MS), and, from measurements thereof, the molar ratio $M_{Li}/M_{Si}$ may be calculated.

Furthermore, when a test cell formed of a negative electrode containing a mixture of the silicon-based active material and the carbon-based active material and a counter electrode lithium is prepared, in the test cell, charge/discharge formed of charge that flows a current such that lithium is inserted in the silicon-based active material and discharge that flows a current such that the lithium is desorbed from the silicon-based active material is repeated 30 times, and a graph showing a relationship between a differential value dQ/dV obtained by differentiating a discharge capacity Q in each charge/discharge by a potential V of the negative electrode based on the counter electrode lithium and the potential V is depicted, the negative electrode active material (silicon-based active material) of the present invention preferably has a peak in the range of 0.40 to 0.55 V of a potential V of the negative electrode during the discharge at X times and after ($1 \leq X \leq 30$). The peak in a V–dQ/dV curve is similar to the peak of the silicon material, and, when designing a battery, capacity is readily developed, since a discharge curve on a higher potential side rises up sharply. Furthermore, when the negative electrode active material develops the peak within 30 times of charge/discharge, it may be judged that a stable bulk is formed.

Furthermore, as a negative electrode binder contained in the negative electrode active material layer, at least any one kind or more of, for example, a polymer material, a synthetic rubber and so on may be used. Examples of the polymer materials include polyvinylidene fluoride, polyimide, polyamide-imide, aramid, polyacrylic acid, lithium polyacrylate, carboxymethylcellulose and the like. Examples of the synthetic rubbers include styrene-butadiene rubbers, fluoro-rubbers, ethylene propylene diene and the like.

As the negative electrode conductive assistant, any one kind or more of carbon materials such as carbon black, acetylene black, graphite, Ketjen black, carbon nanotube, carbon nanofiber and the like may be used.

The negative electrode active material layer may be formed by, for example, a coating method. The coating method is a method in which the particles of negative electrode active material and the binder, further, as needs arise, a conductive assistant, and a carbon material are mixed, followed by dispersing in an organic solvent or water, further followed by coating.

(Method for Producing Negative Electrode)

A negative electrode may be produced according to, for example, the following procedure. First, a method for producing a negative electrode active material used in the negative electrode will be described. In the beginning, particles of silicon compound containing a silicon compound ($SiO_x$: $0.5 \leq x \leq 1.6$) are prepared. Next, lithium is inserted into the particles of silicon compound. Thus, particles of negative electrode active material are prepared. Furthermore, the lithium may be inserted into the particles of silicon compound after a carbon material is coated on the particles of silicon compound.

Next, lithium nitride is generated on a surface of the particles of negative electrode active material. By the way, the lithium nitride may be formed on a surface of the particles of negative electrode active material simultaneously with the insertion of the lithium into the particles of silicon compound. Then, the particles of negative electrode active material on a surface of which the lithium nitride is formed are washed with a solution containing water to generate $Li_2CO_3$ and LiOH on a surface of the particles of negative electrode active material. According to the above process, the particles of negative electrode active material in which a content of $Li_2CO_3$ is 0.01% by mass or more and 5.00% by mass or less relative to a mass of the particles of negative electrode active material and a content of LiOH is 0.01% by mass or more and 5.00% by mass or less relative to the mass of the particles of negative electrode active material are prepared. Next, a negative electrode active material is produced with the prepared particles of negative electrode active material.

More specifically, the negative electrode active material may be produced as shown below. At the beginning, a raw material that generates silicon oxide gas is heated under presence of inert gas, under reduced pressure, and in the temperature range of from 900° C. to 1600° C. to generate silicon oxide gas. When considering a surface oxygen of metallic silicon powder and a slight amount of oxygen in a reaction furnace, a mixing molar ratio is desirably in the range of 0.8<metallic silicon powder/silicon dioxide powder<1.3.

Generated silicon oxide gas is solidified and deposited on an adsorption plate. Then, with a temperature inside a reaction furnace lowered to 100° C. or less, a deposit of silicon oxide is taken out, followed by crushing, pulverizing with a ball mill or a jet mill. As was described above, particles of silicon compound may be produced. By the way, Si crystallites in the particles of silicon compound may be controlled by changing a vaporization temperature, or heat treatment after generation.

Here, a layer of a carbon material may be formed on a superficial layer of the particles of silicon compound. As a method of forming the layer of carbon material, a thermal decomposition CVD method is desirable. A method of generating the layer of carbon material by the thermal decomposition CVD method will be described.

First, the particles of silicon compound are set in a furnace. Next, hydrocarbon gas is introduced into the furnace, and an internal temperature of furnace is elevated. Although a decomposition temperature is not particularly limited, 1200° C. or less is desirable, and 950° C. or less is more desirable. When the decomposition temperature is set to 1200° C. or less, unintentional disproportionation of the particles of active material may be suppressed. After elevating the internal temperature of furnace to a predetermined temperature, a carbon layer is generated on a surface of the particles of silicon compound. Furthermore, the hydrocarbon gas that becomes a raw material of the carbon material is, though not particularly limited, desirable to be $n \leq 3$ in a $C_nH_m$ composition. In the case of $n \leq 3$, a production cost may be lowered, and, the physical properties of a decomposition product is made excellent.

Next, Li is inserted into the particles of negative electrode active material containing the particles of silicon compound prepared as shown above to make at least one kind or more of $Li_2SiO_3$ and $Li_4SiO_4$ contain. The insertion of the Li is preferably performed by a redox method.

In the modification due to the redox method, for example, first, by soaking the particles of silicon oxide in a solution A in which lithium is dissolved in an ether solvent, the lithium may be inserted. In the solution A, a polycyclic aromatic compound or a straight chain polyphenylene compound may be further contained. Furthermore, the particles of silicon oxide may be soaked in the solution A while bubbling $N_2$ therein. By performing thus, simultaneously with the insertion of the lithium into the particles of silicon oxide, lithium nitride ($Li_3N$) may be formed on a surface of the particles of silicon oxide. An amount of generated lithium nitride may be controlled by adjusting an implantation time of $N_2$, a timing of bubbling, and an atmosphere. The atmosphere at this time is preferably an inert atmosphere such as Ar or $N_2$.

After the insertion of Li, when the particles of silicon oxide are soaked in a solution B containing a polycyclic aromatic compound or a derivative thereof, active lithium may be desorbed from the particles of silicon oxide. Examples of solvents of the solution B include ether-based solvents, ketone-based solvents, ester-based solvents, alcohol-based solvents, amine-based solvents, or mixed solvents thereof.

Furthermore, after soaking in the solution B, when the particles of silicon oxide are soaked in a solution C containing the alcohol-based solvent, a carboxylic acid-based solvent, water, or mixed solvent thereof, more abundant active lithium may be desorbed from the particles of silicon oxide. Furthermore, in place of the solution C, a solution C' that contains a compound having a quinoid structure in a molecule as a solute, and contains the ether-based solvent, the ketone-based solvent, the ester-based solvent, or mixed solvent thereof as the solvent may be used. Furthermore, the soaking of the particles of silicon oxide in the solutions B, C and C' may be repeated. Thus, when the active lithium is desorbed after the insertion of lithium, the negative electrode active material having higher water resistance is formed. After that, a method of cleaning with alcohol, alkali water in which lithium carbonate is dissolved, weak acid, or pure water may be applied.

Furthermore, a thermal doping method may be used to insert the Li into the particles of negative electrode active material. In the modification due to the thermal doping method, for example, the particles of negative electrode active material may be modified by mixing with a LiH powder or a Li powder followed by heating under a non-oxidizing atmosphere. As the non-oxidizing atmosphere, for example, an Ar atmosphere or the like may be used. More specifically, first, the LiH powder or Li powder and the powder of silicon oxide are thoroughly mixed under the Ar atmosphere and are sealed and a sealed vessel is stirred as a whole to homogenize. After that, modification is performed by heating in the range of from 700° C. to 750° C. Furthermore, in this case, the Li may be detached from the silicon compound by sufficiently cooling the powder after heating, followed by washing with alcohol, alkali water, weak acid or pure water.

By the way, when the thermal doping method is used to modify, a $^{29}$Si-MAS-NMR spectrum obtained from the particles of silicon oxide is different from that in the case where the redox method is used. In FIG. 2, one example of a $^{29}$Si-MAS-NMR spectrum measured from particles of silicon compound when modified by a redox method is shown. In FIG. 2, a peak provided in the vicinity of −75 ppm is a peak derived from $Li_2SiO_3$, and a peak provided in −80 to −100 ppm is a peak derived from Si. Furthermore, a peak appearing in the vicinity of −110 ppm is a peak derived from $SiO_2$. By the way, there is a case where a peak of a silicate other than $Li_2SiO_3$ and $Li_4SiO_4$ appears over from −80 to −100 ppm.

Furthermore, in FIG. 3, one example of the $^{29}$Si-MAS-NMR spectrum measured from the particles of silicon oxide when modified by the thermal doping method is shown. In FIG. 3, a peak provided in the vicinity of −75 ppm is a peak derived from $Li_2SiO_3$, and a peak provided in −80 to −100 ppm is a peak derived from Si. Furthermore, a peak appearing in the vicinity of −110 ppm is a peak derived from $SiO_2$. By the way, there is a case where a peak of a silicate other than $Li_2SiO_3$ and $Li_4SiO_4$ appears over from −80 to −100 ppm. By the way, a peak of $Li_4SiO_4$ may be confirmed from the XPS spectrum.

Furthermore, $Li_2CO_3$ and LiOH are generated on a surface of the particles of negative electrode active material by generating lithium nitride on a surface of the particles of negative electrode active material, and after that, by washing the particles of negative electrode active material on a surface of which the lithium nitride was generated with a solution containing water. The step of generating the lithium nitride on a surface of the particles of negative electrode active material may be performed separately from the insertion of the Li but may be performed simultaneously therewith. Here, the step of generating the lithium nitride on a surface of the particles of negative electrode active material may be performed by making the particles of negative electrode active material and a lithium compound and nitrogen contact in a dispersion liquid, or also by mixing the particles of negative electrode active material and LiH, followed by heating.

For example, the generation of the lithium nitride and the generation of the $Li_2CO_3$ and LiOH may be performed according to the following procedure. First, LiH and the particles of negative electrode active material are mixed in an inert atmosphere containing nitrogen. After that, the mixture is heated and fired at a temperature of, for example, about 730° C. Thus, lithium nitride ($Li_3N$) may be generated on a surface of the particles of negative electrode active material in a mottled pattern. Furthermore, simultaneously at this time, also insertion of lithium into the particles of silicon compound contained in the particles of negative electrode active material occurs. By the treatment like this, the step of generating the lithium nitride on a surface of the particles of negative electrode active material and the step of inserting the lithium into the particles of silicon compound may simultaneously performed. By the way, as the inert atmosphere containing nitrogen, for example, a mixed air of Ar and $N_2$ may be used. Subsequently, the particles of negative electrode active material are washed with, for example, 4 times equivalent of water to the particles of negative electrode active material to generate lithium carbonate and lithium hydroxide on a surface of the particles of negative electrode active material.

According to the above procedure, the particles of negative electrode active material that have a content of $Li_2CO_3$ of 0.01% by mass or more and 5.00% by mass or less relative to a mass of the particles of negative electrode active material and a content of LiOH of 0.01% by mass or more and 5.00% by mass or less relative to a mass of the particles of negative electrode active material may be prepared.

Each content of LiOH and $Li_2CO_3$ remaining on a surface of the particles of negative electrode active material may be calculated in the following manner according to a neutralization titration. For example, first, the particles of negative electrode active material and pure water are measured in a beaker at a mass ratio of 1:20, followed by dispersing the particles of negative electrode active material with a magnetic stirrer for 5 minutes. Then, the dispersion liquid is filtered. Next, 5 ml of an obtained filtrate is titrated with 0.1 N hydrochloric acid to obtain a first end point (pH7.5; a (ml)), and a second end point (pH5.0; b (ml)), and each content of LiOH and $Li_2CO_3$ is calculated from the following calculation formulas. Here, one example of a neutralization titration curve is shown in FIG. 4.

(Content of $Li_2CO_3$)={amount of pure water (g)/amount of filtrate (g)}×2×(b/1000)×(normality of hydrochloric acid titration liquid×factor)×(½)×(molecular weight of $Li_2CO_3$)×(100%)/amount of sample (g))

(Content of LiOH)={amount of pure water (g)/amount of filtrate (g)}×((a−b)/1000)×(normality of hydrochloric acid titration liquid×factor)×(molecular weight of LiOH)×(100%)/amount of sample (g))

With the particles of negative electrode active material prepared as shown above, a negative electrode active material is produced. Then, after a negative electrode mixture is formed by mixing the negative electrode active material, with other materials such as the negative electrode binder, the conductive assistant or the like, an organic solvent or water is added to form a slurry. Next, on a surface of the negative electrode current collector, the slurry is coated and dried to form a negative electrode active material layer. At this time, as needs arise, hot press or the like may be applied. As was described above, a negative electrode may be prepared.

<Lithium Ion Secondary Battery>

Next, a lithium ion secondary battery of the present invention will be described. The lithium ion secondary battery of the present invention uses a negative electrode that contains the negative electrode active material of the present invention. Here, as a specific example, a laminate film type lithium ion secondary battery is cited as an example.

[Configuration of Laminate Film Type Lithium Ion Secondary Battery]

A laminate film type lithium ion secondary battery 20 shown in FIG. 5 houses a wound electrode body 21 mainly inside a sheet-like exterior member 25. The wound body has a separator between a positive electrode and a negative electrode and is formed by winding. Furthermore, there is a case where the positive electrode and the negative electrode have a separator therebetween and house a laminate body. In both electrode bodies, a positive electrode lead 22 is attached to the positive electrode, and a negative electrode lead 23 is attached to the negative electrode. An outermost peripheral part of the electrode body is protected by a protective tape.

The positive and negative electrode leads are led in one direction, for example, from the inside of the exterior member 25 toward an outside thereof. The positive electrode lead 22 is made of an electrically conductive material such as aluminum or the like, and the negative electrode lead 23 is made of an electrically conductive material such as nickel or copper.

The exterior member 25 is a laminate film in which, for example, a fusion layer, a metal layer, and a surface protective layer are laminated in this order, and, the laminate film has outer peripheral parts fused with each other or adhered by an adhesive in a fusion layer of two sheets of film such that the fusion layers may face with the wound electrode body 21. The fusion part is a film such as polyethylene or polypropylene, and the metal part is an aluminum foil or the like. The protective layer is, for example, nylon or the like.

An adhesive film 24 is inserted between the exterior member 25 and the positive and negative electrode leads to prevent ambient air from intruding. The material is, for example, a polyethylene, polypropylene, or polyolefin resin.

[Positive Electrode]

A positive electrode has a positive electrode active material layer on both sides or on one side of a positive electrode current collector in the same manner as in the negative electrode 10 of, for example, FIG. 1.

The positive electrode current collector is made of an electrically conductive material such as aluminum or the like.

A positive electrode active material layer contains any one or more kinds of positive electrode materials capable of occluding and emitting lithium ions, and, may contain other materials such as a binder, a conductive assistant, and a dispersant depending on a design. In this case, details of the binder and the conductive assistant are the same as in the negative electrode binder and the negative electrode conductive assistant described above.

As the positive electrode material, a Li-containing compound is desirable. As the Li-containing compound, a composite oxide made of, for example, lithium and a transition metal element, or a phosphate compound having the Li and the transition metal element may be used. Among these positive electrode materials, compounds containing at least one or more kinds of nickel, iron, manganese, and cobalt are preferred. Chemical formulas for these are represented by, for example, $Li_xM1O_2$ or $Li_yM2PO_4$. In the formulas, M1 and M2 represent at least one or more kinds of the transition metal elements. Values of "x" and "y" show different values depending on a battery charge/discharge state, but, are generally shown by $0.05 \leq x \leq 1.10$ and $0.05 \leq y \leq 1.10$.

As the composite oxide containing the lithium and the transition metal element, for example, a lithium-cobalt composite oxide ($Li_xCoO_2$), a lithium-nickel composite oxide ($Li_xNiO_2$) may be used. As the phosphate compound having the lithium and the transition metal element, for example, a lithium-iron phosphate compound ($LiFePO_4$) or a lithium-iron-manganese phosphate compound ($LiFe_{1-u}Mn_uPO_4$ ($0<u<1$)) may be used. This is because when these positive electrode materials are used, high battery capacity may be obtained and excellent cycle characteristics may be also obtained.

[Negative Electrode]

A negative electrode has the same configuration as the negative electrode 10 for lithium ion secondary battery of the FIG. 1, and has a negative electrode active material layer 12, for example, on both sides of the current collector 11. The negative electrode preferably has a negative electrode charge capacity larger than an electric capacity (charge capacity as a battery) obtained from a positive electrode active material agent. This is because the precipitation of the lithium metal on the negative electrode may be suppressed.

The positive electrode active material layer is provided on a part of both sides of the positive electrode current collector, and the negative electrode active material layer is also provided on a part of both sides of the negative electrode current collector. In this case, for example, the negative electrode active material layer provided on the negative electrode current collector is provided on a region where an opposing positive electrode active material layer is not present. This is because stable battery design is carried out.

A non-facing region, that is, a region where the negative electrode active material layer and the positive electrode active material layer do not face each other is hardly influenced by the charge/discharge. Therefore, a state of the negative electrode active material layer just immediately after the formation is maintained. Thereby, a composition of the negative electrode active material or the like may be accurately investigated with excellent reproducibility irrespective of the presence or non-presence of the charge/discharge.

[Separator]

The separator separates the positive electrode and the negative electrode and allows passage of lithium ions while preventing current short-circuit accompanying the contact of both electrodes from occurring. The separator is formed of a porous film made of, for example, a synthetic resin, or ceramic, and may have a laminate structure in which two or more kinds of porous films are laminated. Examples of the synthetic resin include polytetrafluoroethylene, polypropylene, polyethylene and the like.

[Electrolytic Solution]

At least a part of the active material layer or the separator is impregnated with a liquid electrolyte (electrolytic solution). The electrolytic solution has an electrolyte salt dissolved in a solvent and may contain other materials such as an additive or the like.

As the solvent, for example, a nonaqueous solvent may be used. Examples of the nonaqueous solvents include ethylene carbonate, propylene carbonate, butylene carbonate, dimethyl carbonate, diethyl carbonate, ethyl methyl carbonate, methyl propyl carbonate, 1,2-dimethoxy ethane, tetrahydrofuran and the like. Among these, it is desirable to use at least one or more kinds of ethylene carbonate, propylene carbonate, dimethyl carbonate, diethyl carbonate, and ethyl methyl carbonate. This is because more excellent characteristics may be obtained. Furthermore, in this case, more advantageous characteristics may be obtained by combining a high viscosity solvent such as ethylene carbonate or propylene carbonate and a low viscosity solvent such as dimethyl carbonate, ethyl methyl carbonate or diethyl carbonate. This is because dissociability or ionic mobility of the electrolyte salt is improved.

When an alloy-based negative electrode is used, it is desirable to contain, in particular as a solvent, at least one kind of a halogenated linear carbonate ester or a halogenated cyclic carbonate ester. Thus, during charge/discharge, in particular during charge, a stable film is formed on a surface of the negative electrode active material. Here, the halogenated linear carbonate ester is a linear carbonate ester having a halogen as a constituent element (at least one hydrogen is substituted with a halogen). Furthermore, the halogenated cyclic carbonate ester is a cyclic carbonic acid ester having a halogen as a constituent element (that is, at least one hydrogen is substituted with a halogen).

Although a kind of the halogen is not particularly limited, fluorine is preferable. This is because a higher-quality film than in other halogens may be formed. Furthermore, the larger the number of halogens is, the more desirable. This is because an obtained film is more stable, and a decomposition reaction of the electrolytic solution is reduced.

Examples of the halogenated linear carbonate esters include carbonic acid fluoromethylmethyl ester and carbonic acid difluoromethylmethyl ester. Examples of the halogenated cyclic carbonate esters include 4-fluoro-1,3-dioxolane-2-one and 4,5-difluoro-1,3-dioxolane-2-one.

It is preferable to contain an unsaturated carbon bond cyclic carbonate ester as a solvent additive. This is because a stable film is formed on a surface of the negative electrode during charge/discharge to be able to suppress a decomposition reaction of the electrolytic solution from occurring. Examples of the unsaturated carbon bond cyclic carbonate ester include vinylene carbonate and vinyl ethylene carbonate.

Furthermore, it is preferable to contain a sultone (cyclic sulfonic acid ester) as the solvent additive. This is because the chemical stability of the battery is improved. Examples of the sultone include propane sultone and propene sultone.

Furthermore, the solvent preferably contains an acid anhydride. This is because the chemical stability of the electrolytic solution is improved. As the acid anhydride, for example, propane disulfonic acid anhydride may be used.

The electrolyte salt may contain any one or more kinds of light metal salts such as lithium salts. As the lithium salt, for example, lithium hexafluorophosphate (LiPF$_6$), lithium tetrafluoroborate (LiBF$_4$) or the like may be used.

A content of the electrolyte salt is preferably 0.5 mol/kg or more and 2.5 mol/kg or less relative to the solvent. This is because high ionic conductivity is obtained.

[Method for Producing Laminate Film Type Secondary Battery]

In the present invention, a negative electrode is prepared with the negative electrode active material produced according to a method for producing the negative electrode active material of the present invention, and with the prepared negative electrode, a lithium ion secondary battery is produced.

At the beginning, a positive electrode is prepared with the above positive electrode material. First, a positive electrode mixture is formed by mixing the positive electrode active material and, as needs arise, a binder and a conductive assistant, followed by dispersing in an organic solvent to form a positive electrode mixture slurry. Subsequently, the mixture slurry is coated on the positive electrode current collector by a coating device such as a knife roll or a die coater with a die head and dried with hot air to obtain a positive electrode active material layer. At the end, the positive electrode active material layer is compression molded by a roll press machine or the like. At this time, heating may be applied, or, heating or compression may be repeated a plurality of times.

Next, by using the same operation procedure as in the preparation of the negative electrode 10 for lithium ion secondary battery, the negative electrode active material layer is formed on the negative electrode current collector to form a negative electrode.

When preparing the positive electrode and the negative electrode, the respective active material layer is formed on both sides of the positive electrode and the negative electrode current collectors. At this time, in any of the electrodes, active material coating lengths on the both surface parts may be displaced (see FIG. 1).

Subsequently, an electrolytic solution is prepared. Further subsequently, by using ultrasonic welding or the like, the positive electrode lead 22 is attached to the positive electrode current collector and the negative electrode lead 23 is attached to the negative electrode current collector (see FIG. 5). Then, the positive electrode and the negative electrode are laminated via the separator, or are wound to prepare a wound electrode body 21, followed by adhering a protective tape to the outermost peripheral part thereof. Next, the wound electrode body is molded into a flat shape. Then, after inserting the wound electrode body between folded film-like exterior member 25, insulation parts of the exterior member are adhered by a thermal fusion method with each other, and with only one direction opened, the wound electrode body is encapsulated. Then, an adhesive film is inserted between the positive electrode lead, and the negative electrode lead and the exterior member. A predetermined amount of the above prepared electrolytic solution is charged from a releasing part, followed by vacuum impregnation. After the impregnation, the releasing part is adhered by a vacuum thermal fusion method. As was described above, the laminate film type lithium ion secondary battery 20 may be produced.

EXAMPLES

In what follows, the present invention will be more specifically described with reference to Examples and Comparative Examples of the present invention. However, the present invention is not limited to these examples.

Example 1-1

According to the following procedure, a laminate film type lithium ion secondary battery 20 shown in FIG. 5 was prepared.

First, a positive electrode was prepared. A positive electrode mixture was prepared by mixing 95% by mass of LiNi$_{0.7}$Co$_{0.25}$Al$_{0.05}$O that is lithium-nickel-cobalt composite oxide (NCA) as a positive electrode active material, 2.5% by mass of a positive electrode conductive assistant, and 2.5% by mass of a positive electrode binder (polyvinylidene fluoride: PVDF). Subsequently, the positive electrode mixture was dispersed in an organic solvent (N-methyl-2-pyllolydone: NMP) to form a paste-like slurry. Subsequently, the slurry was coated on both sides of a positive electrode current collector with a coating machine having a die head, followed by drying with a hot air type dryer. At this time, the positive electrode current collector having a thickness of 15 μm was used. At the end, a roll press was used to perform compression molding.

Next, a negative electrode was prepared. First, a negative electrode active material was prepared in the following manner. A raw material in which metallic silicon and silicon dioxide are mixed was introduced into a reaction furnace, what was vaporized in an atmosphere having a degree of vacuum of 10 Pa was deposited on an adsorption plate, after sufficiently cooling, a deposit was taken out and pulverized by a ball mill. A value of "x" of SiO$_x$ of particles of silicon compound obtained like this was 0.5. Then, a particle size of the particles of silicon compound was adjusted by classification. Thereafter, a carbon material was coated on a surface of the particles of silicon compound by performing thermal CVD.

Subsequently, lithium was inserted into the particles of silicon compound by a redox method to modify. First, the particles of silicon compound were soaked in a solution (solution A$_1$) in which a piece of lithium and biphenyl that is a linear chain polyphenylene compound are dissolved in tetrahydrofuran (hereinafter, referred to also as THF). At this time, $N_2$ was supplied in the solution $A_1$ by bubbling. The solution $A_1$ of Example 1-1 was prepared by adding a lithium piece of a mass portion of 10% by mass relative to a mixed solution of the THF and biphenyl after dissolving the biphenyl at a concentration of 1 mol/L in the THF solvent. Furthermore, a temperature of the solution when soaking the particles of silicon compound was 20° C. and a soaking time was 10 hours. Thereafter, the particles of silicon compound were filtered. By the treatment, the lithium was inserted into the particles of silicon compound.

Next, the particles of silicon compound after insertion of lithium were soaked in a solution (solution B) in which naphthalene was dissolved in THF. The solution B of Example 1-1 was prepared by dissolving naphthalene in the THF solvent at the concentration of 2 mol/L. Furthermore, a temperature of the solution when soaking the particles of silicon compound was set to 20° C. and a soaking time was set to 20 hours. Thereafter, the particles of silicon compound were filtered.

Next, the particles of silicon compound after contact with the solution B were soaked in a solution (solution C) in which p-benzoquinone is dissolved in the THF at the concentration of 1 mol/L. The soaking time was set to 2 hours. After that, the particles of silicon compound were filtered.

Next, the particles of silicon compound were subjected to a washing treatment, and the particles of silicon compound after washing treatment were dried under reduced pressure. Thus, the particles of silicon compound on a surface of which lithium nitride is contained were obtained.

Next, $Li_2CO_3$ and LiOH were generated on a surface of the particles of negative electrode active material by washing the particles of negative electrode active material with a solution containing water. Specifically, the particles of negative electrode active material were washed with a mixed solution of ethanol and water and lithium carbonate and lithium hydroxide were generated on a surface of the particles of negative electrode active material.

A part of the particles of negative electrode active material prepared here was sampled, and amounts of lithium carbonate and lithium hydroxide present on a surface of the particles of negative electrode active material were measured. More specifically, first, sampled particles of negative electrode active material and pure water were measured and mixed at a mass ratio of 1:20 in a beaker, followed by dispersing the particles of negative electrode active material for 5 minutes with a magnet stirrer. Then, the dispersion solution was filtered. At this time, the pH of a filtrate was 12.2. Furthermore, the molar ratio $M_{Li}/M_{Si}$ of Li and Si contained in the filtrate was 6.1. Next, a first end point (pH 7.5) and a second end point (pH 5.0) were obtained by titrating 5 ml of the filtrate with 0.1 N hydrochloric acid, and each content of LiOH and $Li_2CO_3$ was calculated. As a result thereof, a content of $Li_2CO_3$ was 0.45% by mass relative to a mass of the particles of negative electrode active material, and a content of LiOH was 0.65% by mass relative to a mass of the particles of negative electrode active material.

Next, a mixed negative electrode active material was prepared by blending the particles of negative electrode active material and a carbon-based active material at a mass ratio of 1:9. Here, as the carbon-based active material, natural graphite coated with a pitch layer and artificial graphite were mixed at a mass ratio of 5:5 and used. Furthermore, a median diameter of the carbon-based active material was 20 μm.

Next, the prepared mixed negative electrode active material, a conductive assistant 1 (carbon nanotubes, CNT), a conductive assistant 2 (carbon fine particles having a median diameter of about 50 nm), a styrene-butadiene rubber (styrene-butadiene copolymer, hereinafter, referred to as SBR), and carboxymethylcellulose (hereinafter, referred to as CMC) were mixed at a dry mass ratio of 92.5:1:1:2.5:3, followed by diluting with pure water to prepare a negative electrode mixture slurry. By the way, the SBR and CMC are negative electrode binders.

Furthermore, as a negative electrode current collector, an electrolytic copper foil having a thickness of 15 μm was used. The electrolytic copper foil contained carbon and sulfur each at a concentration of 70 mass ppm. At the end, the negative electrode mixture slurry was coated on the negative electrode current collector, followed by drying at 100° C.×1 hour in a vacuum atmosphere. After drying, a deposit amount of the negative electrode active material layer a unit area in one surface of the negative electrode (called also as area density) was 5 mg/cm².

Next, after solvents (4-fluoro-1,3-dioxolan-2-one (FEC), ethylene carbonate (EC) and dimethyl carbonate (DMC)) were mixed, an electrolyte salt (lithium hexafluorophosphate: $LiPF_6$) was dissolved to prepare an electrolytic solution. In this case, a composition of the solvent was set to FEC:EC:DMC=10:20:70 by volume ratio, and a content of the electrolyte salt was set to 1.2 mol/kg relative to the solvent.

Next, a secondary battery was assembled as shown below. At the beginning, an aluminum lead was ultrasonically welded to one end of the positive electrode current collector, and a nickel lead was welded to one end of the negative electrode current collector. Subsequently, the positive electrode, the separator, the negative electrode, and the separator were laminated in this order, and wound in the longitudinal direction to obtain a wound electrode body. A winding end part thereof was fixed with a PET protective tape. As the separator, a laminate film (thickness: 12 μm) in which a film having a porous polyethylene as a main component is sandwiched by a film having a porous polypropylene as a main component was used. Subsequently, after sandwiching the electrode body between the exterior members, outer periphery parts excluding one side were thermally fused each other and the electrode body was housed inside thereof. As the exterior member, an aluminum laminated film in which a nylon film, an aluminum foil, and a polypropylene film are laminated was used. Subsequently, the prepared electrolytic solution was charged from an opening part and impregnated under a vacuum atmosphere, followed by the thermal fusion to seal.

The cycle characteristics and first time charge/discharge characteristics of the secondary battery prepared as shown above were evaluated.

The cycle characteristics were investigated as shown below. At the beginning, two cycles of charge/discharge were carried out at 0.2C under the atmosphere of 25° C. for stabilizing the battery, and a discharge capacity at the second cycle was measured. Subsequently, the charge/discharge was performed until a total number of cycles becomes 499 cycles, and the discharge capacity was measured at each cycle. At the end, a capacity retention rate (hereinafter, referred to also simply as retention rate) was calculated by dividing the discharge capacity at the $500^{th}$ cycles obtained under 0.2C charge/discharge by the discharge capacity at the $2^{nd}$ cycle. For normal cycles, that is, from $3^{rd}$ cycle to $499^{th}$ cycle, the charge/discharge was carried out at 0.7C charge and 0.5C discharge.

When investigating the first time charge/discharge characteristics, a first time efficiency (hereinafter, in some cases, referred to as initial efficiency) was calculated. The first time efficiency was calculated from a formula expressed by first time efficiency (%)=(first time discharge capacity/first time charge capacity)×100. The atmosphere temperature was set to the same as in the case where the cycle characteristics were investigated.

Example 1-2 to Example 1-3, Comparative Examples 1-1 and 1-2

Each secondary battery was produced in the same condition as in Example 1-1 except that an oxygen amount in a bulk of the silicon compound was adjusted. In this case, an amount of oxygen was adjusted by changing a ratio of metallic silicon and silicon dioxide in a raw material of the silicon compound and a heating temperature. Values of "x" in the silicon compound expressed by SiOx in Examples 1-1 to 1-3 and Comparative Examples 1-1 and 1-2 are shown in Table 1.

At this time, the particles of negative electrode active material of Examples 1-1 to 1-3 and Comparative Examples 1-1 and 1-2 had the following properties. A median diameter of the particles of negative electrode active material was 4 µm. In the inside of the particles of silicon compound, $Li_2SiO_3$ and $Li_4SiO_4$ were contained. Furthermore, the silicon compound had a half value width (2θ) of a diffraction peak due to a Si (111) plane obtained from X-ray diffractometry of 2.257° and a crystallite size due to the Si (111) crystal plane of 3.77 nm.

Furthermore, in all Examples and Comparative Examples, peaks in Si and Li silicate regions provided in −60 to −95 ppm as chemical shift values obtained from $^{29}$Si-MAS-NMR spectra appeared. Furthermore, in all of the Examples and Comparative Examples, a relationship between a maximum peak intensity A in the Si and Li silicate region provided by −60 to −95 ppm as chemical shift values obtained from the $^{29}$Si-MAS-NMR spectra and a peak intensity value B in a $SiO_2$ region provided by −96 to −150 ppm satisfied A>B.

Furthermore, an average thickness of the carbon material contained in the particles of negative electrode active material was 100 nm.

Furthermore, from the negative electrode prepared as was described above and a counter electrode lithium, a coin cell type test cell of 2032 size was prepared, and a discharge behavior thereof was evaluated. More specifically, first, at the counter electrode Li, a constant current and a constant voltage charge was performed up to 0 V, and, at the time point where the current density reached 0.05 mA/cm$^2$, the charge was stopped. After that, constant current discharge was performed up to 1.2 V. The current density at this time was 0.2 mA/cm$^2$. The charge/discharge was repeated 30 times, from the data obtained in each charge/discharge, a graph was depicted with a capacity variation rate (dQ/dV) on a vertical axis and a voltage (V) on a horizontal axis, and whether the V may obtain a peak in the range of from 0.4 to 0.55 (V) was confirmed. As a result thereof, in Example 1-1 and Comparative Example 1 where x of SiOx is 0.5 or less, the peak could not be obtained. In other Examples and Comparative Examples, the peak was obtained in the charge/discharge within 30 times, and the peak appeared in all charge/discharge from the charge/discharge where the peak appeared for the first time to the 30$^{th}$ charge/discharge.

Results of evaluation of Examples 1-1 to 1-3, and Comparative Examples 1-1 and 1-2 are shown in Table 1.

TABLE 1

SiOx $D_{50}$ = 4 µm, graphite (natural graphite:artificial graphite = 5:5) $D_{50}$ = 20 µm SiOx ratio 10% by mass, $Li_2SiO_3$, $Li_4SiO_4$, carbon material average thickness 100 nm half value width 2.257°, crystallite 3.77 nm, modification method:redox method, A > B $Li_2CO_3$ content 0.45% by mass, LiOH content 0.65% by mass, filtrate: pH 12.2, $M_{Li}/M_{Si}$ = 6.1

|  | x | Capacity Retention Rate (%) | Initial Efficiency (%) |
|---|---|---|---|
| Comparative Example 1-1 | 0.3 | 47 | 88.3 |
| Example 1-1 | 0.5 | 82.8 | 87.6 |
| Example 1-2 | 1 | 83.0 | 88.1 |
| Example 1-3 | 1.6 | 82.9 | 87.4 |
| Comparative Example 1-2 | 1.8 | — | — |

As shown in Table 1, when the value of x in the silicon compound expressed by SiOx is outside of the range of 0.5≤x≤1.6, the battery characteristics were degraded. For example, as shown in Comparative Example 1-1, when an amount of oxygen is insufficient (x=0.3), the initial efficiency was improved, but the capacity retention rate was remarkably degraded. On the other hand, when the amount of oxygen is excessive (x=1.8) as shown in Comparative Example 1-2, since the electric conductivity was degraded and the capacity of silicon oxide was not substantially developed, the evaluation was stopped.

Example 2-1, Example 2-2

Each secondary battery was prepared under the same condition as in Example 1-2 except that the kind of lithium silicate that is contained in the inside of the particles of silicon compound is changed as shown in Table 2, and the cycle characteristics and initial efficiency were evaluated. In the redox method, the kind of the lithium silicate in the particles of negative electrode active material was adjusted by adjusting a soaking time and a stirring condition into the solution.

Comparative Example 2-1

A secondary battery was prepared under the same condition as in Example 1-2 except that the lithium was not inserted into the particles of silicon compound, and the cycle characteristics and initial efficiency were evaluated.

Results of Example 2-1, Example 2-2, and Comparative Example 2-1 are shown in Table 2.

TABLE 2

SiOx x = 1 $D_{50}$ = 4 µm, graphite (natural graphite:artificial graphite = 5:5) $D_{50}$ = 20 µm SiOx ratio 10% by mass, carbon material average thickness 100 nm, dQ/dV, half value width 2.257°, crystallite 3.77 nm, modification method:redox method, A > B

|  | Lithium Silicate | Capacity Retention Rate (%) | Initial Efficiency (%) |
|---|---|---|---|
| Example 2-1 | $Li_2SiO_3$ | 82.8 | 87.9 |
| Example 2-2 | $Li_4SiO_4$ | 82.7 | 87.9 |
| Example 1-2 | $Li_2SiO_3$, $Li_4SiO_4$ | 83.0 | 88.1 |
| Comparative Example 2-1 | — | 79.0 | 84.5 |

The capacity retention rate and initial efficiency were improved due to inclusion of stable lithium silicates such as $Li_2SiO_3$ and $Li_4SiO_4$ by the silicon compound. In particular, when both lithium silicates of $Li_2SiO_3$ and $Li_4SiO_4$ are contained, the capacity retention rate and initial efficiency were more improved. On the other hand, the capacity retention rate and initial efficiency in Comparative Example 2-1 in which the lithium was not contained in the silicon compound were degraded.

Examples 3-1 to 3-4

Each secondary battery was prepared under the same condition as in Example 1-2 except that a content of $Li_2CO_3$ relative to a mass of the particles of negative electrode active material and a content of LiOH relative to the mass of the particles of negative electrode active material were changed as shown in Table 3, and the cycle characteristics and initial efficiency were evaluated. Each content of $Li_2CO_3$ and LiOH relative to the mass of the particles of negative electrode active material was controlled by adjusting an amount of lithium nitride generated on a surface of the particles of negative electrode active material. By the way, an amount of the lithium nitride was adjusted by changing an implantation time of $N_2$ in the solution $A_1$, a timing of bubbling, and an atmosphere during lithium doping.

Examples 3-5 to 3-8

Each secondary battery was prepared under the same condition as in Example 1-2 except that a modification method of the particles of negative electrode active material was changed to the thermal doping method and the content of $Li_2CO_3$ relative to the mass of the particles of negative electrode active material and the content of LiOH relative to the mass of the particles of negative electrode active material were changed as shown in Table 3, and the cycle characteristics and initial efficiency were evaluated. The thermal doping method was carried out as shown below. First, the particles of negative electrode active material which were coated with a carbon material were thoroughly mixed with a LiH powder under a mixed atmosphere of Ar and $N_2$ and sealed, and a sealed vessel was stirred as a whole to homogenize. After that, the modification was performed by heating in the range of from 700° C. to 750° C. Furthermore, the particles of negative electrode active material after heating were sufficiently cooled to detach a part of active Li from the silicon compound, followed by washing with alcohol. According to the above treatment, the lithium was inserted into the particles of negative electrode active material. During the thermal doping, lithium nitride was generated on a surface of the particles of negative electrode active material. Thereafter, in the same manner as in Example 1-2, the particles of negative electrode active material were washed with a solution containing water and $Li_2CO_3$ and LiOH were generated on a surface of the particles of negative electrode active material thereby.

Comparative Example 3-1

A secondary battery was prepared under the same condition as in Example 1-2 except that the $Li_2CO_3$ and LiOH were not generated on a surface of the negative electrode active material, and the cycle characteristics and initial efficiency were evaluated. In this case, the particles of negative electrode active material were not modified.

Comparative Example 3-2

A secondary battery was prepared under the same condition as in Example 1-2 except that both the content of $Li_2CO_3$ and the content of LiOH were set more than 5.0% by mass as shown in Table 3, and the cycle characteristics and initial efficiency were evaluated.

Comparative Examples 3-3 and 3-4

Each secondary battery was prepared under the same condition as in Example 1-2 except that the modification method of the particles of negative electrode active material was changed to the thermal doping method, and both the contents of $Li_2CO_3$ and the content of LiOH were set more than 5.0% by mass, and the cycle characteristics and initial efficiency were evaluated.

Furthermore, in Examples 3-1 to 3-8 and Comparative Examples 3-1 to 3-4, in order to measure the stability of each of the negative electrode mixture slurries, a part of the prepared negative electrode mixture slurry was sampled by 30 g separately from the slurry for preparing the secondary battery and stored at 20° C., and gas generation states at 5 hours, 10 hours, 24 hours, 48 hours, 72 hours and one week after the preparation of the negative electrode mixture slurry were confirmed. Furthermore, the gas generation state of the negative electrode mixture slurry prepared in Example 1-2 was confirmed according to the same procedure.

TABLE 3

SiOx x = 1 $D_{50}$ = 4 μm, graphite (natural graphite:artificial graphite = 5:5) $D_{50}$ = 20 μm
SiOx ratio 10% by mass, carbon material average thickness 100 nm
dQ/dV, A > B

| | Modification Method | Content of $Li_2CO_3$ (% by mass) | Content of LiOH (% by mass) | pH of Filtrate | $M_{Li}/M_{Si}$ in Filtrate | Capacity Retention Rate (%) | Initial Efficiency (%) | Time up to Gas Generation |
|---|---|---|---|---|---|---|---|---|
| Example 3-1 | Redox | 0.42 | 0.58 | 12.1 | 5.2 | 84.0 | 88.8 | 72 hours |
| Example 1-2 | Redox | 0.45 | 0.65 | 12.2 | 6.1 | 83.0 | 88.1 | 72 hours |
| Example 3-2 | Redox | 1.74 | 1.98 | 12.5 | 7.9 | 83.3 | 88.2 | 72 hours |
| Example 3-3 | Redox | 3.91 | 3.98 | 12.7 | 8.4 | 83.6 | 88.0 | 72 hours |
| Example 3-4 | Redox | 4.92 | 4.95 | 12.8 | 9.7 | 83.0 | 88.7 | 72 hours |
| Example 3-5 | Thermal Doping | 0.51 | 0.45 | 11.7 | 4.2 | 81.0 | 86.5 | 48 hours |
| Example 3-6 | Thermal Doping | 0.62 | 0.43 | 11.8 | 3.5 | 81.0 | 87.2 | 48 hours |
| Example 3-7 | Thermal Doping | 2.92 | 2.77 | 12.4 | 7.7 | 82.4 | 87.6 | 48 hours |

TABLE 3-continued

SiO$x$ x = 1 D$_{50}$ = 4 μm, graphite (natural graphite:artificial graphite = 5:5) D$_{50}$ = 20 μm
SiO$x$ ratio 10% by mass, carbon material average thickness 100 nm
dQ/dV, A > B

|  | Modification Method | Content of Li$_2$CO$_3$ (% by mass) | Content of LiOH (% by mass) | pH of Filtrate | M$_{Li}$/M$_{Si}$ in Filtrate | Capacity Retention Rate (%) | Initial Efficiency (%) | Time up to Gas Generation |
|---|---|---|---|---|---|---|---|---|
| Example 3-8 | Thermal Doping | 4.97 | 4.93 | 12.7 | 9.8 | 82.5 | 87.7 | 48 hours |
| Comparative Example 3-1 | Not modified | 0 | 0 | 6.0 | 0 | 79.0 | 83.5 | — |
| Comparative Example 3-2 | Redox | 5.1 | 5.2 | 12.3 | 10.2 | 78.0 | 84.2 | 10 hours |
| Comparative Example 3-3 | Thermal Doping | 3.8 | 20.1 | 13.3 | 0.3 | 76.0 | 85.8 | 5 hours |
| Comparative Example 3-4 | Thermal Doping | 5.1 | 4.9 | 12.2 | 10.1 | 79.1 | 85.9 | 10 hours |

As shown in Table 3, in Examples 3-1 to 3-8 in which the condition that both the content of Li$_2$CO$_3$ and the content of LiOH are 0.01% by mass or more and 5.00% by mass or less to a mass of the particles of negative electrode active material is satisfied, the capacity retention rate and initial efficiency were improved than Comparative Examples 3-1 to 3-4 in which the condition is not satisfied.

Furthermore, as shown in Table 3, when the pH is in the range of from 10 to 13, since the time up to the gas generation from preparation of the negative electrode mixture slurry becomes longer than in Comparative Example 3-3 where the pH is outside of the range, a stable negative electrode mixture slurry was obtained. By the way, in Comparative Example 3-1, the gas was not generated because the particles of negative electrode active material were not modified.

Furthermore, as shown in Table 3, when the molar ratio M$_{Li}$/M$_{Si}$ satisfies the relationship of 10≥M$_{Li}$/M$_{Si}$≥0.5, the initial efficiency and cycle characteristics were more improved because the content of Li$_2$CO$_3$ and the content of LiOH become an adequate amount.

Examples 4-1 to 4-9

Each secondary battery was prepared under the same condition as in Example 1-2 except that the crystallinity of Si crystallites of the particles of silicon compound was varied as shown in Table 4, and the cycle characteristics and initial efficiency were evaluated. By the way, the crystallinity of the Si crystallite in the particles of silicon compound may be adjusted by change of a vaporization temperature of the raw material or a heat treatment after generation of the particles of silicon compound. Although a half value width is calculated as 20° or more in Example 4-9, this is a result of fitting by an analysis software, and a peak is not substantially obtained. Accordingly, the silicon compound of Example 4-9 may be said to be substantially amorphous.

TABLE 4

SiO$x$ x = 1 D$_{50}$ = 4 μm, graphite (natural graphite:artificial
graphite = 5:5) D$_{50}$ = 20 μm SiO$x$ ratio 10% by mass, Li$_2$SiO$_3$,
Li$_4$SiO$_4$, carbon material average thickness 100 nm dQ/dV,
modification method:redox method, A > B Li$_2$CO$_3$ content 0.45%
by mass, LiOH content 0.65% by mass, filtrate: pH 12.2, M$_{Li}$/M$_{Si}$ = 6.1

|  | Half Value Width (°) | Si (111) Crystallite Size (nm) | Capacity Retention Rate (%) | Initial Efficiency (%) |
|---|---|---|---|---|
| Example 4-1 | 0.756 | 11.42 | 81.4 | 87.9 |
| Example 4-2 | 0.796 | 10.84 | 81.9 | 87.8 |
| Example 4-3 | 1.025 | 8.55 | 82.2 | 87.9 |
| Example 4-4 | 1.218 | 7.21 | 82.6 | 87.9 |
| Example 4-5 | 1.271 | 6.63 | 82.8 | 87.9 |
| Example 4-6 | 1.845 | 4.62 | 82.8 | 88.0 |
| Example 1-2 | 2.257 | 3.77 | 83.0 | 88.1 |
| Example 4-7 | 2.593 | 3.29 | 83.2 | 88.1 |
| Example 4-8 | 10.123 | 1.524 | 83.5 | 87.7 |
| Example 4-9 | 20.221 | 0 | 84.0 | 87.9 |

High capacity retention rates were obtained in particular in low crystalline materials where the half value width is 1.2° or more and the crystallite size due to the Si(111) plane is 7.5 nm or less. Among these, the most excellent characteristics were obtained when the silicon compound is amorphous.

Example 5-1

A secondary battery was prepared under the same condition as in Example 1-2 except that the silicon compound that has a relationship between a maximum peak intensity value A due to a Si and silicate region and a peak intensity value B due to the SiO$_2$ region of A<B was used, and the cycle characteristics and initial efficiency were evaluated. In this case, the intensity A due to Li$_2$SiO$_3$ was reduced by reducing an amount of Li$_2$SiO$_3$ by reducing an insertion amount of lithium during modification.

TABLE 5

SiOx x = 1 D$_{50}$ = 4 μm, graphite (natural graphite:artificial
graphite = 5:5) D$_{50}$ = 20 μm SiOx ratio 10% by mass, Li$_2$SiO$_3$,
Li$_4$SiO$_4$, carbon material average thickness 100 nm, dQ/dV, half value
width 2.257°, crystallite 3.77 nm, modification method:redox method,
Li$_2$CO$_3$ content 0.45% by mass, LiOH content 0.65% by mass,
Filtrate: pH 12.2, M$_{Li}$/M$_{Si}$ = 6.1

|  | A · B | Capacity Retention Rate (%) | Initial Efficiency (%) |
|---|---|---|---|
| Example 5-1 | A < B | 82.6 | 87.2 |
| Example 1-2 | A > B | 83.0 | 88.1 |

As obvious from Table 5, the battery characteristics were improved when the relationship of the peak intensities satisfies A>B.

Example 6-1

A secondary battery was prepared under the same condition as in Example 1-2 except that a negative electrode active material in which V could not obtain a peak in the range of from 0.40 V to 0.55 V in all charges/discharges in a V–dQ/dV curve obtained by 30 times of charge/discharge in the test cell was used, and the cycle characteristics and initial efficiency were evaluated.

TABLE 6

SiOx D$_{50}$ = 4 μm, graphite (natural graphite:artificial
graphite = 5:5) D$_{50}$ = 20 μm SiOx ratio 10% by mass, Li$_2$SiO$_3$,
Li$_4$SiO$_4$, carbon material average thickness 100 nm half value width
2.257°, crystallite 3.77 nm, modification method:redox method, A > B
Li$_2$CO$_3$ content 0.45% by mass, LiOH content 0.65% by mass,
Filtrate: pH 12.2, M$_{Li}$/M$_{Si}$ = 6.1

|  | dQ/dV peak | Capacity Retention Rate (%) | Initial Efficiency (%) |
|---|---|---|---|
| Example 6-1 | No | 81.8 | 87.5 |
| Example 1-2 | Yes | 83.0 | 88.1 |

In order for a discharge curve shape has a sharp rise-up, the silicon compound (SiOx) is necessary to show the same discharge behavior as the Si. The silicon compound that does not develop a peak in the above range by 30 times of charge/discharge has a relatively mild discharge curve. Accordingly, when a secondary battery is formed, the initial efficiency degraded a little. When a peak is developed within 30 times of charge/discharge, a stable bulk is formed, and the capacity retention rate and initial efficiency were improved.

Examples 7-1 to 7-6

Each secondary battery was prepared under the same condition as in Example 1-2 except that the median diameter of the particles of negative electrode active material was varied as shown in Table 7, and the capacity retention rate and initial efficiency were evaluated.

TABLE 7

SiOx x = 1, graphite (natural graphite:artificial
graphite = 5:5) D$_{50}$ = 20 μm SiOx ratio 10% by mass, Li$_2$SiO$_3$,
Li$_4$SiO$_4$, carbon material average thickness 100 nm dQ/dV, half value
width 2.257°, crystallite 3.77 nm, modification method:redox method,
A > B Li$_2$CO$_3$ content 0.45% by mass, LiOH content 0.65% by mass,
Filtrate: pH 12.2, M$_{Li}$/M$_{Si}$ = 6.1

|  | Median Diameter (μm) | Capacity Retention Rate (%) | Initial Efficiency (%) |
|---|---|---|---|
| Example 7-1 | 0.1 | 80.9 | 87.9 |
| Example 7-2 | 0.5 | 81.8 | 88.0 |
| Example 7-3 | 1 | 82.3 | 88.2 |
| Example 1-2 | 4 | 83.0 | 88.1 |
| Example 7-4 | 10 | 83.1 | 88.1 |
| Example 7-5 | 15 | 82.4 | 88.2 |
| Example 7-6 | 20 | 80.1 | 87.8 |

The retention rate was improved when the median diameter of the particles of negative electrode active material is 0.5 μm or more. This is considered that a surface area a mass of the particles of negative electrode active material is not excessively large, and an area where a side reaction occurs could be made smaller. On the other hand, when the median diameter is 15 μm or less, the particles are difficult to be cracked during charge, and an SEI (solid electrolyte interface) due to a newly generated surface during charge/discharge is difficult to be generated. Accordingly, the loss of reversible Li may be suppressed. Furthermore, when the median diameter of the particles of negative electrode active material is 15 μm or less, an expansion amount of the particles of silicon compound during charge does not become large. Accordingly, physical and electrical breakdown of the negative electrode active material layer due to the expansion may be suppressed.

Example 8-1

A secondary battery was prepared under the same condition as in Example 1-2 except that a carbon material was not coated on a surface of the particles of silicon compound, and the cycle characteristics and initial efficiency were evaluated.

Example 8-2 to 8-5

Each secondary battery was prepared under the same condition as in Example 1-2 except that an average thickness of a carbon material coated on a surface of the particles of silicon compound was varied, and the cycle characteristics and initial efficiency were evaluated. The average thickness of the carbon material may be adjusted by varying the CVD condition.

TABLE 8

SiOx x = 1, D$_{50}$ = 4 μm, graphite (natural graphite:artificial
graphite = 5:5) D$_{50}$ = 20 μm SiOx ratio 10% by mass, Li$_2$SiO$_3$,
Li$_4$SiO$_4$, carbon material, dQ/dV, half value
width 2.257°, crystallite 3.77 nm, modification method:redox method,
A > B Li$_2$CO$_3$ content 0.45% by mass, LiOH content 0.65% by mass,
Filtrate: pH 12.2, M$_{Li}$/M$_{Si}$ = 6.1

|  | Average Thickness (nm) | Retention Rate (%) | Initial Efficiency (%) |
|---|---|---|---|
| Example 1-2 | 100 | 83.0 | 88.1 |
| Example 8-1 | 0 | 79.7 | 86.0 |
| Example 8-2 | 10 | 82.3 | 88.0 |
| Example 8-3 | 500 | 83.1 | 88.4 |
| Example 8-4 | 1000 | 83.5 | 88.6 |
| Example 8-5 | 5000 | 83.3 | 88.5 |

As is obvious from Table 8, when the carbon material was applied, the retention rate and initial efficiency are improved. In particular, when the average thickness of the carbon material is 10 nm or more, the capacity retention rate and initial efficiency may be improved because the electric conductivity is improved. On the other hand, when the average thickness of the carbon material is 5000 nm or less, the battery capacity may be prevented from decreasing because an amount of particles of silicon compound may be sufficiently secured.

Example 9-1

A secondary battery was prepared under the same condition as in Example 1-2 except that a ratio of a mass of the particles of a silicon-based active material in the negative electrode active material was varied, and an increase rate of battery capacity was evaluated.

In FIG. 6, a graph expressing a relationship between a ratio of the particles of silicon-based active material to a total amount of the negative electrode active material and an increase rate of battery capacity of the secondary battery is shown. A graph shown by A in FIG. 6 shows an increase rate of a battery capacity when a ratio of the particles of silicon compound is increased in the negative electrode active material of the negative electrode of the present invention. On the other hand, a graph shown by B in FIG. 6 shows an increase rate of a battery capacity when a ratio of the particles of silicon compound in which Li was not doped is increased (reference example). As obvious from FIG. 6, when the ratio of the silicon compound becomes 6% by mass or more, an increase rate of the battery capacity becomes larger than ever, and a volume energy density particularly remarkably increases.

By the way, it is to be noted that the present invention is not limited to the foregoing embodiment. The embodiment is just an exemplification, and any of examples that have substantially the same feature and demonstrate the same functions and effects as those in the technical concept described in claims of the present invention are included in the technical scope of the present invention.

The invention claimed is:

1. A negative electrode active material comprising:
particles of negative electrode active material,
wherein the particles of negative electrode active material contain particles of silicon compound containing a silicon compound SiO$_x$:0.5≤x≤1.6;
the particles of silicon compound contain Li$_2$SiO$_3$;
the particles of negative electrode active material contain Li$_2$CO$_3$ and LiOH on a surface thereof;
a content of the Li$_2$CO$_3$ is 0.01% by mass or more and 5.00% by mass or less relative to a mass of the particles of negative electrode active material and a content of the LiOH is 0.01% by mass or more and 5.00% by mass or less relative to the mass of the particles of negative electrode active material; and
when a test cell formed of a negative electrode containing a mixture of the negative electrode active material and a carbon-based active material and a counter electrode lithium is prepared, in the test cell, charge/discharge including charge during which a current is flowed so as to insert lithium into the negative electrode active material and discharge during which the current is flowed so as to desorb the lithium from the negative electrode active material is carried out 30 times, and a graph showing a relationship between a differential value dQ/dV obtained by differentiating a discharge capacity Q in each charge/discharge by a potential V of the negative electrode based on the counter electrode lithium and the potential V is depicted, the potential V of the negative electrode during discharges on or after X times (1≤X≤30) has a peak in the range of from 0.40 V to 0.55 V.

2. The negative electrode active material according to claim 1, wherein the particles of negative electrode active material have the pH of from 10 to 13 of a filtrate obtained by dispersing the particles of negative electrode active material in pure water such that a mass ratio of the particles of negative electrode active material and the pure water is 1:20 and by filtering.

3. The negative electrode active material according to claim 1, wherein the particles of negative electrode active material have a molar ratio M$_{Li}$/M$_{Si}$ of Li and Si contained in the filtrate obtained by dispersing the particles of negative electrode active material in pure water and by filtering that satisfies a relationship of 10≤M$_{Li}$/M$_{Si}$≤0.5.

4. The negative electrode active material according to claim 1, wherein the particles of silicon compound have a half value width (2θ) of a diffraction peak due to a Si(111) crystal plane obtained by X-ray diffractometry of 1.2° or more and a crystallite size corresponding to the crystal plane of 7.5 nm or less.

5. The negative electrode active material according to claim 1, wherein the particles of negative electrode active material satisfy a relationship of A>B between a maximum peak intensity value A in a Si and Li silicate region provided by −60 to −95 ppm as a chemical shift value and a peak intensity value B of a SiO$_2$ region provided by −96 to −150 ppm as the chemical shift value, which are obtained from $^{29}$Si-MAS-NMR spectrum.

6. The negative electrode active material according to claim 1, wherein a median diameter of the particles of negative electrode active material is 1.0 μm or more and 15 μm or less.

7. The negative electrode active material according to claim 1, wherein the particles of negative electrode active material contain a carbon material on a superficial layer part.

8. The negative electrode active material according to claim 7, wherein an average thickness of the carbon material is 10 nm or more and 5000 nm or less.

9. A mixed negative electrode active material comprising:
the negative electrode active material according to claim 1; and
a carbon-based active material.

10. A negative electrode for nonaqueous electrolyte secondary battery, comprising:
the mixed negative electrode active material according to claim 9,
wherein a ratio of a mass of the negative electrode active material relative to a sum total of masses of the negative electrode active material and the carbon-based active material is 6% by mass or more.

11. A negative electrode for nonaqueous electrolyte secondary battery, comprising:
a negative electrode active material layer formed with the mixed negative electrode active material according to claim 9; and
a negative electrode current collector,
wherein the negative electrode active material layer is formed on the negative electrode current collector; and
the negative electrode current collector contains carbon and sulfur, and each content thereof is 100 mass ppm or less.

12. A lithium ion secondary battery comprising:
the negative electrode active material according to claim 1 as a negative electrode.

* * * * *